United States Patent
Nandakumar et al.

(10) Patent No.: US 9,876,840 B2
(45) Date of Patent: Jan. 23, 2018

(54) METHOD AND APPARATUS FOR DYNAMICALLY GENERATING MEDIA SEQUENCES ON DEMAND FOR HTTP LIVE STREAMING

(75) Inventors: Sarun Madarakal Nandakumar, Bangalore (IN); Daniel Ernesto Barreto, Los Altos, CA (US)

(73) Assignee: WYSE TECHNOLOGY L.L.C., San Jose, CA (US)

( * ) Notice: Subject to any disclaimer, the term of this patent is extended or adjusted under 35 U.S.C. 154(b) by 1532 days.

(21) Appl. No.: 13/207,368

(22) Filed: Aug. 10, 2011

(65) Prior Publication Data

US 2012/0290688 A1 Nov. 15, 2012

Related U.S. Application Data

(60) Provisional application No. 61/484,169, filed on May 9, 2011.

(51) Int. Cl.
| | | |
|---|---|---|
| *G06F 15/16* | (2006.01) | |
| *H04L 29/08* | (2006.01) | |
| *H04N 21/2387* | (2011.01) | |
| *H04N 21/61* | (2011.01) | |
| *H04N 21/643* | (2011.01) | |
| *H04N 21/6587* | (2011.01) | |
| *H04L 29/06* | (2006.01) | |

(52) U.S. Cl.
CPC .......... *H04L 67/02* (2013.01); *H04L 65/4084* (2013.01); *H04L 65/607* (2013.01); *H04L 65/608* (2013.01); *H04N 21/2387* (2013.01); *H04N 21/6125* (2013.01); *H04N 21/64322* (2013.01); *H04N 21/6587* (2013.01)

(58) Field of Classification Search
CPC ............... H04L 65/4084; H04L 65/607; H04L 65/608; H04L 67/02; H04L 12/2498; H04L 41/509; H04L 69/00; H04L 29/06462
USPC ........................................................ 709/219
See application file for complete search history.

(56) References Cited

U.S. PATENT DOCUMENTS

| | | |
|---|---|---|
| 2008/0177994 A1 | 7/2008 | Mayer |
| 2009/0319557 A1* | 12/2009 | Lipka .................. H04L 12/1881 |
| 2010/0100899 A1 | 4/2010 | Bradbury et al. |
| 2010/0125649 A1 | 5/2010 | Day et al. |
| 2010/0135643 A1 | 6/2010 | Fleming |

* cited by examiner

*Primary Examiner* — Kevin Bates
*Assistant Examiner* — Ronak Patel
(74) *Attorney, Agent, or Firm* — Baker Botts L.L.P.

(57) ABSTRACT

Dynamically generating media sequence files on demand for HTTP live streaming is described. The operations may include receiving a request for a media sequence file, over a network utilizing HTTP live streaming, based on a forward or backward seek operation of a remote media player; in response to the request, determining a position of a media source file that corresponds to the media sequence file to enable seeking to the position of the media source file to generate the media sequence file from the media source file; and facilitating provision of a notification that the media sequence file is generated. The media sequence file represents one of sequential portions of the media source file. The format of the media sequence file is different from a format of the media source file. The format of the media sequence file is compatible with the remote media player.

31 Claims, 9 Drawing Sheets

| | Title | Length | Type | Rating |
|---|---|---|---|---|
| 320A | Today's Sports | 30 minutes | Sports | 4 |
| | California Gardening | 20 minutes | Hobby | 3 |
| | ... | ... | ... | ... |
310A
FIG. 3A
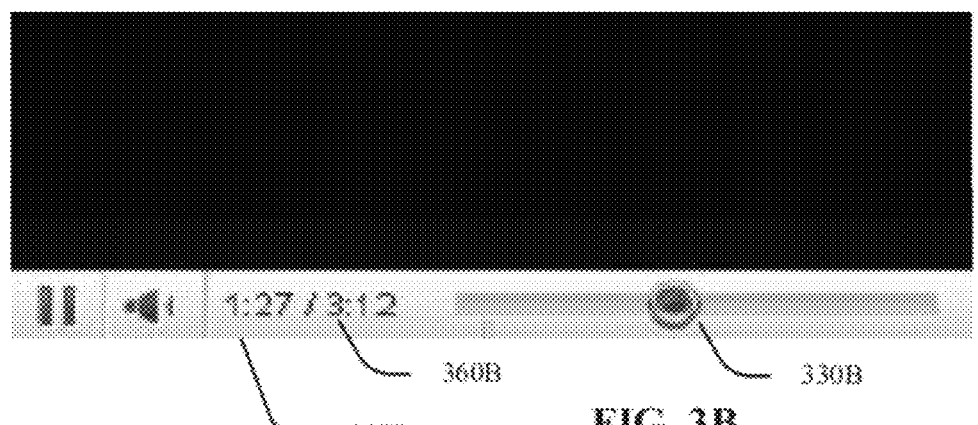
FIG. 3B
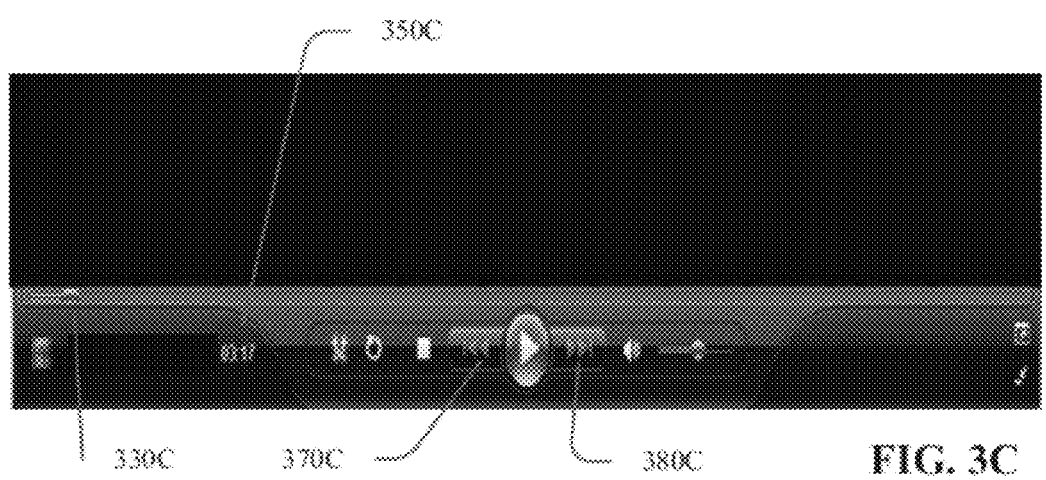
FIG. 3C

METHOD AND APPARATUS FOR DYNAMICALLY GENERATING MEDIA SEQUENCES ON DEMAND FOR HTTP LIVE STREAMING

CROSS-REFERENCES TO RELATED APPLICATIONS

The present application claims the benefit of priority under 35 U.S.C. §119 from U.S. Provisional Patent Application Ser. No. 61/484,169, entitled "Method and apparatus for dynamically generating media clips on demand for live streaming," filed on May 9, 2011, which is hereby incorporated by reference in its entirety for all purposes.

FIELD

The subject technology relates in general to media streaming, and more particularly to, dynamically generating media sequences on demand for HTTP live streaming.

BACKGROUND

In the past, users have played video and audio from CD-ROMs or downloaded and played them from a remote web server. In these cases, the video and audio had to exist locally to the users (i.e., on CD-ROMs or completely downloaded to the user's computer) before the user could start playing the video or audio. As the network connection technology and media decoding, encoding, and compression techniques have advanced, streaming media has become popular. For example, a user can use a small portable device such as a cell phone or a tablet to stream media from a web server, and the user can start playing the media prior to completing the download of the media from the web server. The current technology, however, does not provide efficient resource utilization when generating media files, particularly, for hypertext transfer protocol (HTTP) live streaming.

SUMMARY

In one aspect of the disclosure, a method for dynamically generating media sequence files on demand for hypertext transfer protocol (HTTP) live streaming may comprise: receiving a request for a media sequence file, over a network utilizing HTTP live streaming, based on a forward or backward seek operation of a remote media player; and in response to the request, determining a position of a media source file that corresponds to the media sequence file to enable seeking to the position of the media source file to generate the media sequence file from the media source file, and facilitating provision of a notification that the media sequence file is generated, wherein the media sequence file represents one of a plurality of sequential portions of the media source file, wherein a format of the media sequence file is different from a format of the media source file, wherein the format of the media sequence file is compatible with the remote media player.

In one aspect of the disclosure, a machine-readable storage medium may be encoded with instructions executable by one or more processors to perform one or more operations. The one or more operations may comprise: receiving a request for a media sequence file, over a network utilizing hypertext transfer protocol (HTTP) live streaming, based on a forward or backward seek operation of a remote media player; and in response to the request, determining a position of a media source file that corresponds to the media sequence file to enable seeking to the position of the media source file to generate the media sequence file from the media source file.

In one aspect of the disclosure, an apparatus may comprise one or more modules configured to perform one or more operations comprising: receiving a request for a media sequence file, over a network utilizing hypertext transfer protocol (HTTP) live streaming, based on a forward or backward seek operation of a remote media player; and in response to the request, determining a position of a media source file that corresponds to the media sequence file to enable seeking to the position of the media source file to generate the media sequence file from the media source file.

In one aspect of the disclosure, an apparatus may comprise means for receiving a request for a media sequence file, over a network utilizing hypertext transfer protocol (HTTP) live streaming, based on a forward or backward seek operation of a remote media player; and means for, in response to the request, determining a position of a media source file that corresponds to the media sequence file to enable seeking to the position of the media source file to generate the media sequence file from the media source file.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

FIG. 3A illustrates an example of a playlist.

FIG. 3B illustrates an example of a screen shot of a display of a media player.

FIG. 3C illustrates an example of a screen shot of a display of a media player.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed, description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology. Like components are labeled with identical element numbers for ease of understanding.

According to an example for streaming media, a web server for an existing design may have media files in various formats (e.g., H.264.mid_quality format. H264.high_quality format, H.264.low_quality format, wmv format, mpeg format). These media files preexist on the web server or in a shared location. When a user's device connects to the web server to play a file, the web server allows streaming if a file compatible with the user's device preexists on the web server or in a shared location. If not, no streaming occurs. Accordingly, streaming occurs only if the media file (including its playlist file and media sequence files) compatible with the user's device exists prior to the user's request for streaming.

In contrast, in an advantageous aspect, the subject technology can allow streaming of media files that do not yet exist when a user requests for streaming. In an advantageous aspect, a web server of the subject technology does not need to generate and maintain media files in various formats prior to receiving a user's request for streaming.

In one aspect, the subject technology relates to systems and methods for remote video seeking for hypertext transfer protocol (HTTP) live streaming using a web server. The existing methodology of HTTP live streaming requires all media files to be present on the media location for streaming and doing seeking operation. In contrast, in an advantageous aspect, the subject technology removes this limitation by dynamically generating the required media files on demand.

Example of System for HTTP Live Streaming

Figure 1:
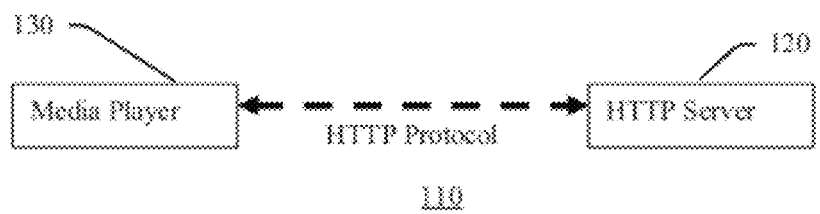
FIG. 1 illustrates an example of a system for hypertext transfer protocol (HTTP) live streaming.

FIG. 1 illustrates an example of a system for HTTP live streaming. An HTTP live streaming system 110 has two components: an HTTP server 120 and a media player 130. The system 110 uses HTTP as a communication protocol. All of the media files are located in the HTTP server 120 with reference to the root folder of the HTTP server 120. The media player 130 queries the media files located at the HTTP server 120 using HTTP protocol. Each media file can be divided into two parts: (a) a playlist file and (b) multiple media sequence files. The playlist file contains the locations and names of the media sequence files and other metadata.

To play a media, the media player 130 first loads the playlist file and retrieves the location and details of the media sequence files from the playlist file. It then requests or queries individual media sequence files separately and render them to the screen of the media player.

To perform video seeking using existing technology, all the media sequence files need to be previously created and present in the media location at HTTP server 120). This prevents the ability to generate the media sequence files dynamically from a media source. HTTP live streaming does not specify a method to overcome this limitation.

One Approach

One approach to address the above-mentioned problem is to scroll (seek) the media (e.g., video) by controlling the media player's scroll bar and restart the generation of media sequence files (e.g., video sequences) from the new scrolled location. This approach, however, has the following shortcomings: (i) The media player needs to be modified for the seek operation to work. In many cases, this modification may not be feasible, or this may require changing a variety of media players depending on the clients that are playing back the content. (ii) The above approach requires the regeneration of compressed content from the new location even though that content might have been generated in the past. In an advantageous aspect, the subject technology overcomes these shortcomings.

First Example of Configuration of Subject Technology

Figure 2A:
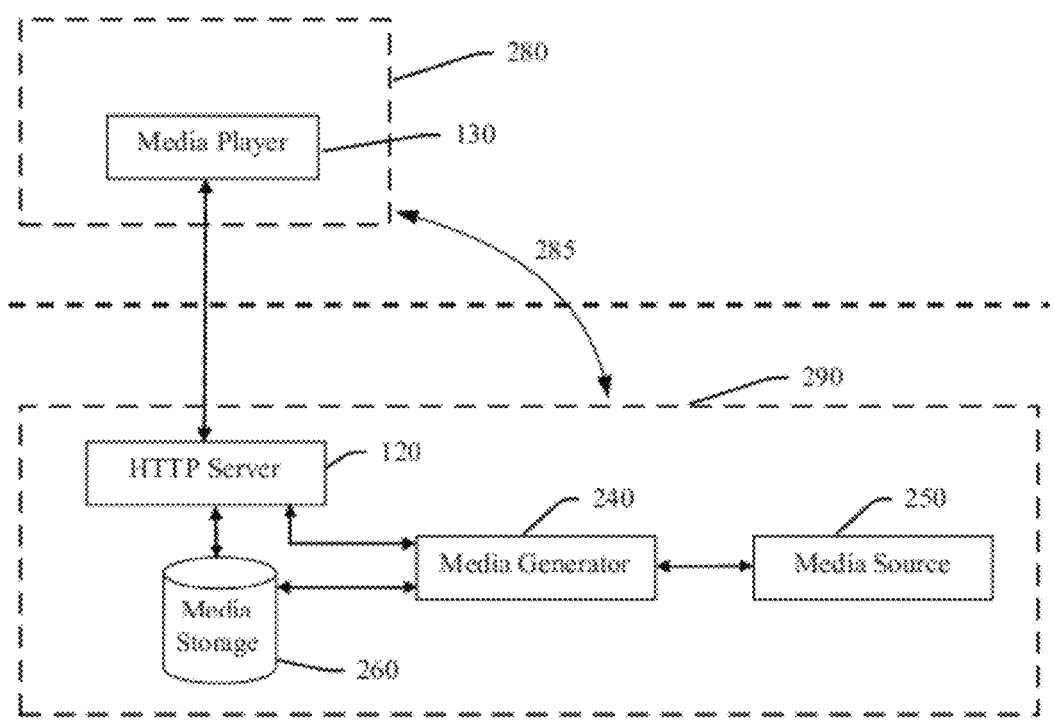
FIG. 2A illustrates an example of a configuration of the subject technology in accordance with one aspect of the disclosure.

FIG. 2A illustrates an example of a configuration of the subject technology in accordance with one aspect of the disclosure. A system 210 may comprise an HTTP server 120. The system 210 may further comprise a remote media player 130 over a network (e.g., a connection such as the Internet or a wireless connection).

Media Player

A media player 130 may be, in one advantageous aspect, any compatible player that understands HTTP live streaming. A media player 130 can request media files or media sequence files by directly querying the HTTP server 120.

HTTP Server

The HTTP server 120 can read the file requested by the media player 130, and if the file requested has not been generated by a media generator 240, then the HTTP server 120 can force the media generator 240 to create the file (e.g., missing media sequence file) and send the file to the media player 130 once it is created.

Media Generator

A media generator 240 can be a software module, hardware module or a combination, and can utilize any media framework (e.g., direct show, gstreamer, helix media server). A media generator 240 can generate a playlist file (e.g., *.m3u8 file) and media sequence files (e.g., *.ts files). A media generator 240 can read a media source file (in one format, e.g., *.wmv file) in a media source 250 and create multiple media sequence files (in another format, *.ts files) that are smaller in size than the media source file. A media source file may be for a long duration, for example, 30 minutes, 1 hour, etc. Each media sequence file may be for a short duration, for example, 5 seconds or 10 seconds.

Media Source

Figure 3D:
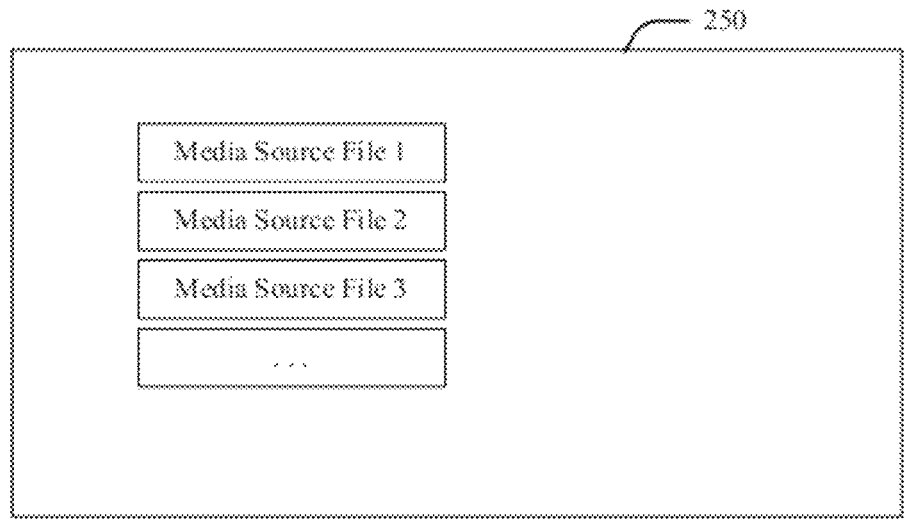
FIG. 3D illustrates an example of media source files.

A media source 250 may contain media source files or applications that contain media contents (e.g., audio/video data) that are used by the media generator 240. See FIG. 3D. A media source 250 may contain files in formats such as, for example, mpeg2 files, mp4 files, wmv files, or files for a streaming server.

Media Storage

A media storage 260 may be used for HTTP live streaming and may store media files. Each media file may have two types of media files: (i) a playlist file (e.g., a file having an extension such as *.m3u8; for example, a file named "index.m3u8") and (ii) multiple media sequence files (e.g., files having an extension such as *.ts; for example, files named "100.ts," "101.ts" etc.). See FIG. 3E. A playlist file may have details of all the media sequence files. A media sequence file may contain audio and/or video data. The extension of a media file (e.g., a playlist file and a media sequence file) can be any format. A media generator 240 can create the files in an efficient way so that no duplicate files are created during a seeking operation.

In one aspect of the disclosure, a system such as a computing device 290 may include (i) an HTTP server 120, (ii) a media generator 240, (iii) a media storage 260, and (iv) a media source 250. A computing device 290 may include one or more computing devices. In another aspect, one computing device may include the components 120, 240 and 260 and another computing device may include the component 250. In yet another aspect, each of the components 120, 240, 260 and 250 may be included in a different computing device. In yet another aspect, the components 120, 240, 260 and 250 may be divided up in different ways and included in two or more separate computing devices. In yet another aspect, some or each of the components 120, 240, 260 and 250 may comprise multiple components/modules, and such multiple components/modules may be included in two or more separate computing devices.

In one aspect, each of an HTTP server and a media generator may be implemented as electronic hardware, computer software, or a combination of both. In one aspect, an HTTP server provides the ability to communicate with another computing device over a network using HTTP.

In one aspect, a computing device 280 may include a media player 130. In another aspect, a media player is a computing device. In one aspect, a media player may be implemented as electronic hardware (e.g., mobile phone, portable media player, or, its subpart), computer software (e.g., Windows Media Player, QuickTime, or its subpart), or a combination of both hardware and software.

Second Example of Configuration of Subject Technology

Figure 2B:
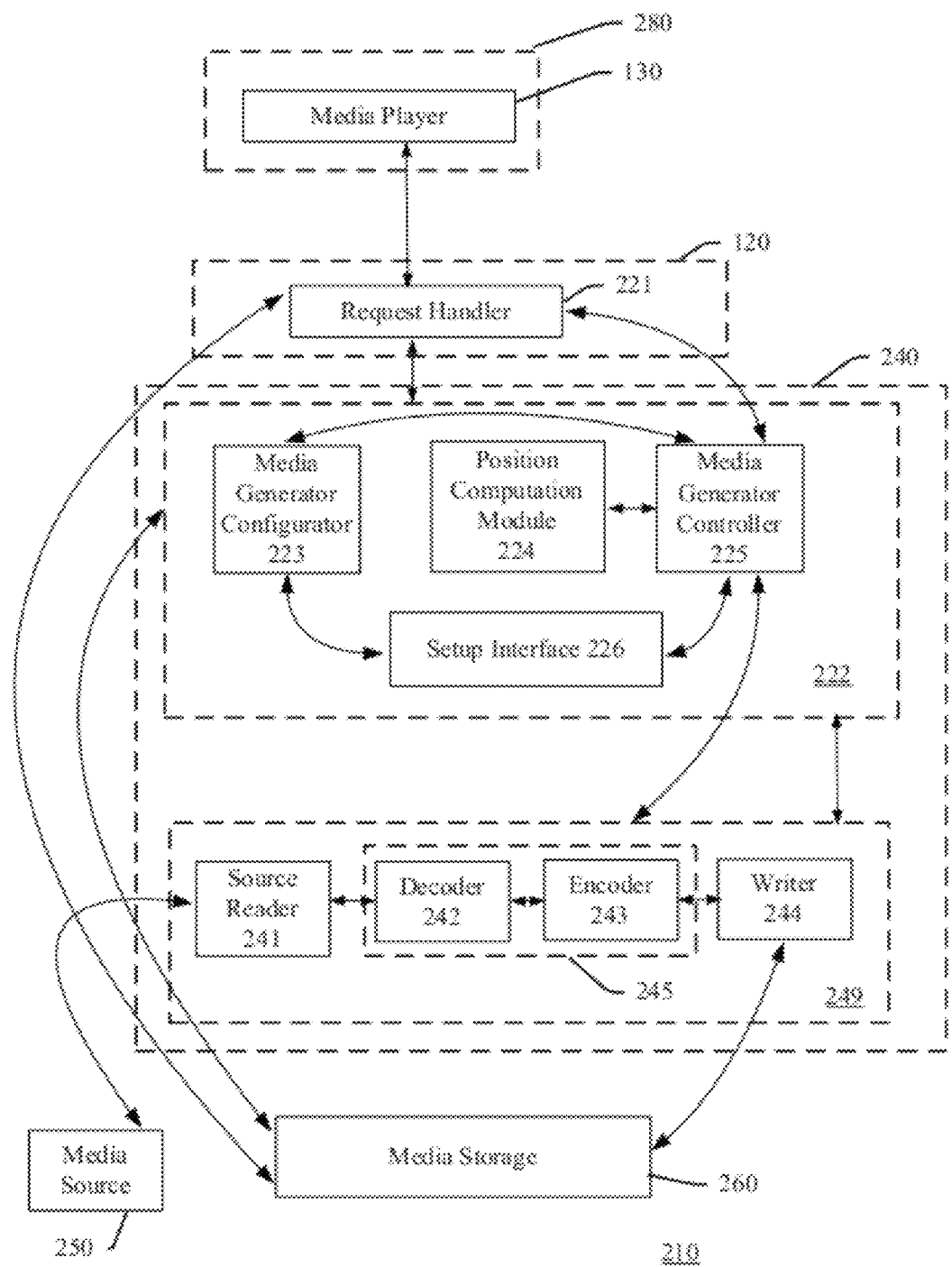
FIG. 2B illustrates an example of a configuration of the subject technology in accordance with one aspect of the disclosure.

FIG. 2B illustrates an example of a configuration of the subject technology in accordance with one aspect of the disclosure. An HTTP server 120 may comprise a request handler 221. A media generator 240 may comprise a controller 222 and a media generation module 249. The controller 222 comprises a media generator controller 225 and a position computation module 224. The controller 222 may also comprise a media generator configurator 223 and a setup interface 226.

Request Handler

In one aspect, the request handler 221 may receive requests for a playlist file and media sequence files from a media player 130. If the request handler 221 determines that the requested file (e.g., a playlist file and a media sequence file) exists, for example, in a media storage 260, then the request handler 221 fetches the requested file and provides it to the media player 130. If the request handler determines that a requested file does not exist, then the request handler 221 forwards the request to a media generator controller 225. Furthermore, when the request handler 221 receives a notification that a file (e.g., a playlist file or media sequence file) is generated, the request handler 221 can fetch the file, e.g., from the media storage 260, and provide it to the media player 130.

Media Generator Controller

In one aspect, the media generator controller 225 can provide communication and control among different components (e.g., 221, 224, 223, 226 and 249). When the media generator controller 225 receives a request, notification or command from a module (e.g., 221, 224, 223, 226 or 249), it can determine the type of the request, notification and command and the appropriate destination module (i.e., to which module the request, notification or command needs to be sent), and provide it to the appropriate destination module selected (e.g., 249, 224, 223, 226, 221).

In one aspect, the media generator controller 225 may receive, for example from a request handler 221, a request for a file (e.g., a missing media sequence file), determine that the request is a request for a missing media sequence file, determine that the appropriate destination is the position computation module 224, and provide the request to the position computation module 224.

In one aspect, the media generator controller 225 may receive the media player's playback configuration information, via the request handler 221 or another channel or a virtual channel (e.g., 285 in FIG. 2A). When the media generator controller 225 determines that it has received the media player's playback configuration information, the controller 225 can determine that the appropriate destination is the media generator configurator 223, and provide the information to the media generator configurator 223.

When the media generator controller 225 receives parameters such as time from the position computation module 224, configuration parameters from the media generator 223 or setup parameters from the setup interface 226, the controller 225 can determine that the parameters are to be sent to the media generation module 249 based on the information and provide the parameters to the media generation module 249.

When the media generator controller 225 receives a notification from the media generation module 249 that a playlist file or a media sequence file is generated, the media generator controller 225 can send the notification to the request handler 221.

Position Computation Module

When the position computation module 224 receives a request for a missing media sequence file (e.g., from 221 via 225), the position computation module 224 computes and converts the request into the position of a media source file (e.g., a time such as 200 seconds) that corresponds to the missing media sequence file (e.g., 200.ts file) and provides the position such as the time to the media generator controller 225. The computation may be based on the information in the playlist file (e.g., the total duration of the media source file, the total number of media sequence files, the names of the media sequence files, and an indication of the order or sequence of the media sequence files) associated with the missing media sequence file.

For one example, the computation may be based on the total duration of the media source file associated with the missing media sequence file, the total number of media sequence files to be generated for the media source file, and the position of the missing media sequence file in relation to other media sequence files for the media source file. For instance, if the total duration is 1 hour, the total number of media sequence files is 720, and the missing media sequence file is the 120th file, then the corresponding time of the media source file is 600 seconds (1 hour*3600 sec/hour*120/720=600 seconds).

Setup Interface

In one aspect, a setup interface 226 is configured to determine the location(s) of the media source files (e.g., a media source 250) and the location(s) for storing the playlist files and the media sequence files (e.g., a media storage 260) and provide the location information to the media generator controller 225, which provides the location information to the media generation module 249.

Media Generator Configurator

In one aspect, a media generator configurator 223 may receive media player configuration information during an initial setup process or during the playback of a media player and generate configuration parameters for the media generation module 249. Such configuration parameters may include, for example, video bit rate, audio bit rate, image aspect ratio (e.g., ratio of the width of an image to its height), and frame rate (e.g., frames/second) to be utilized by a transcoder 245.

During the initial setup, the media generator configurator 223 may receive information via, e.g., the setup interface 226 and provide the configuration parameters to the media generation module 249 via, e.g., the setup interface 226 and the media generator controller 225. During a playback, the media generator configurator 223 may receive information via, e.g., the media generator controller 225 and provide the configuration parameters to the media generation module 249 via, e.g., the media generator controller 225. In another aspect, the media generator configurator 223 may receive/send information via other channels.

In one aspect, if the media player configuration information changes during the playback of a media player 130, the media generator configurator 223 may detect the change and adjust the media generator configuration parameters in response. For example, if the quality or bandwidth of the network between the computing devices 280 and 290 is lowered because the network has changed from Wi-Fi to 3G, then in response to receiving the notification that the quality or bandwidth of the network has lowered, the media generator configurator 223 may adjust the parameters of the encoder 243 such as the video and audio bit rates to lower the quality of the media to be transmitted to the media player 130.

Media Generation Module

In one aspect, a media generation module 249 may comprise a source reader 241, a transcoder 245 and a writer 244. The transcoder 245 may comprise a decoder 242 and an encoder 243.

In response to an initial setup request (e.g., from 225), the media generation module 249 may set up its configuration parameters such as the location of the selected media source file (e.g., media source 250), the location where the media output files (e.g., media sequence files) are to be stored (e.g., media storage 260), and the configuration parameters of the various components of the media generation module 249 (e.g., 241, 242, 243 and 244).

The source reader 241 may read a media source file, in one aspect, the media generation module 249 (e.g., 241) or another component such as a media generator controller 225 may determine the duration of the media source file and the total number of media sequence files to be generated. The media generation module 249 may create, write a playlist file (e.g., store the playlist file using a writer 244 into the media storage 260), and notify the creation of the playlist file (e.g., to the media player 130 via 221 and 225 or via another channel). A playlist file may contain information about the media source file and the media sequence files (e.g., total duration of the media source file, the total number of media sequence files, the sequence of the media sequence files, the names of the media sequence files, etc.).

The source reader 241 of the media generation module 249 may read data (e.g., a media source file) in a media source 250 and feed the data into modules 242 and 243. The modules 242 and 243 may create media sequence files in sequence and write the media sequence files into the output file location (e.g., into 260 using 244). The request handler 221 can fetch and provide each media sequence file to the media player 130 after receiving a request for each media sequence file from the media player. When the request handler 221 cannot find the requested media sequence file, it notifies the media generation module 249 (e.g., via 225).

In response to a request/command (e.g., from the media generator controller 225), the source reader 241 may start reading a media source file (e.g., read a media source file in the media source 250 from the beginning of the file (e.g., at time 0 during the initial setup) or start reading a media source file from a specific requested position (e.g., from a requested time such as 60 seconds). The source reader 241 may start reading a media sequence file in the media source 250 from a set position and stop reading the media sequence file when the stream is complete or if the position is reset to another value (or another seek). Hence, the media generation module 249 may start creating all the media sequence files from the set position and stop creating the media sequence files when the stream is complete or if the position is reset to another value (or another seek).

The decoder 242 may decode the media read from the media source file and the encoder 243 may encode the media using the configuration parameters. The writer 244 may write media sequence files into the media storage 260.

Various Illustrations of Operations

Described below are various illustrations of media playback and seeking operations in different levels of detail in accordance with various aspects of the disclosure.

Illustration 1

Referring to FIGS. 2A, 2B and 3A-3E, in accordance with one aspect of the disclosure, an example of media playback and seeking operations is illustrated with respect to a media player and other components.

(i) A user of a media player 130 selects the name of a media source file 320A in FIG. 3A) to play from a playlist (e.g., 310A).

Figure 3E:
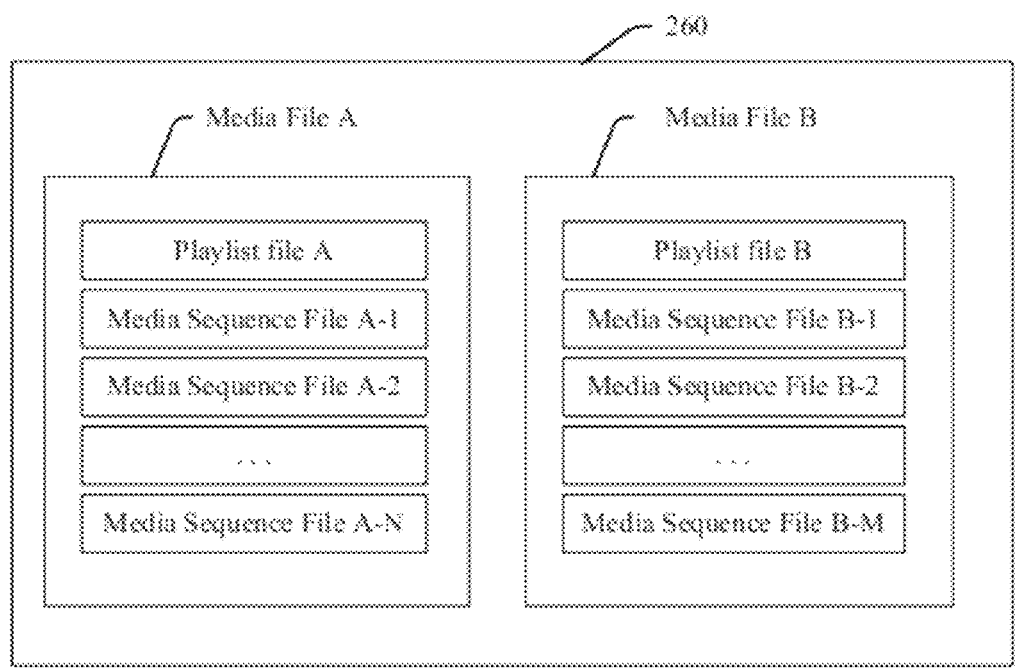
FIG. 3E illustrates an example of media files that may be stored in a media storage.
Figure 4:
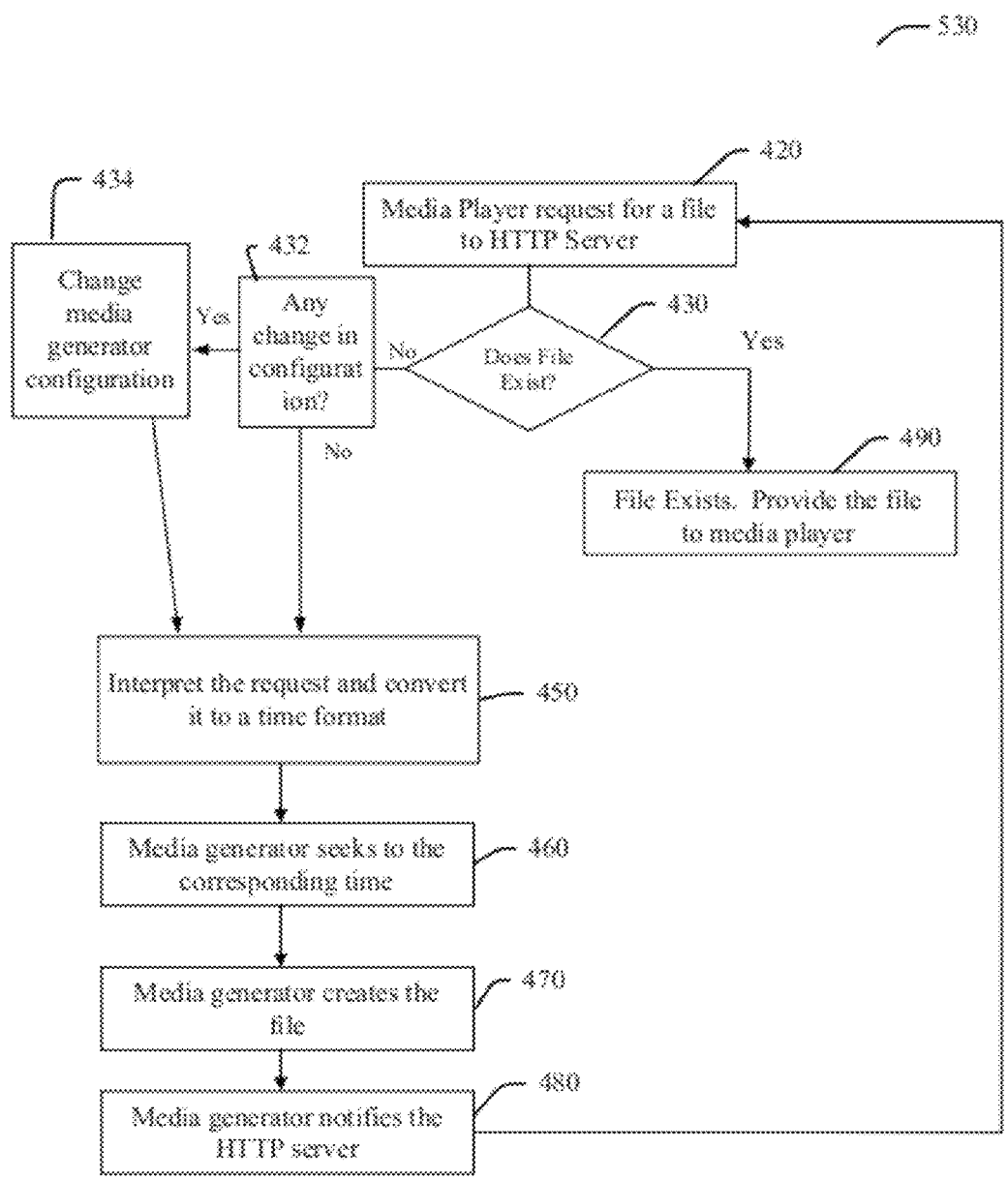
FIG. 4 illustrates an example of a process of dynamically generating media sequence files.

(ii) The media player 130 starts playing the media sequence files media sequence files A-1, A-2, etc. in FIG. 3E) of the media file (e.g., media file A in FIG. 3E) associated with the selected media source file (e.g., media source file 1 in FIG. 3D) whose filename (e.g., 320A) is shown on the playlist 310A). The media player 130 can display to the user a progress bar (e.g., 330B, 330C in FIGS. 3B and 3C) with a seek option (e.g., a forward/backward seek 330B and 330C, a forward seek 380C, a backward seek 370C) and the total duration (e.g., 360B).

(iii) The user may have the media player 130 seek forward or backward. In the examples shown in FIGS. 3B and 3C, a forward seek and a backward seek can be accomplished by clicking a location on a progress bar or one of the elements 370C or 380C.

(iv) The media player 130 moves the playback forward or backward in accordance with the user's request seeking forward or backward.

(v) The media player 130 may display its current time (e.g., 350B) and the total duration (e.g., 360B).

Illustration 2

Referring to FIGS. 2A and 2B, in accordance with one aspect of the disclosure, an example of media playback and seeking operations is illustrated with reference to a media generator and other components.

(i) A media generation module 249 (e.g., source reader 241) may read a media source file (e.g., a file with a .wmv extension) from a media source 250.

(ii) A media generation module 249 (e.g., 241 or other components) may determine the total duration of the media source file and determine the total number of media sequence files required for the playback. The media generation module may then populate a playlist file with this information. When a media player 130 requests the playlist file, the media player assumes that all the media sequence files required for the playback exist (e.g., in media storage 260) even though not all media sequence files may have yet been created. Thus, in one preferred aspect, the media playback and seeking operations are independent of the media player.

(iii) When an HTTP server 120 (e.g., request handler 221) receives, from a media player 130, a request for a media sequence file that does not yet exist, the request handler 221 sends the request to the media generator controller 225, which determines the type of request and forwards the request to the position computation module 224.

(iv) The position computation module 224 converts the request to the corresponding time format and sends the result to the media generator controller 225, which forwards the result to the media generation module 249 so that the media generation module 249 can seek to the required position. For example, when the media player 130 requests for file5.ts of the playlist file, the media generation module 249 understands that it needs to seek to the 5th second of the media source file and generate the missing media sequence file.

(v) Once the media generation module 249 generates the missing media sequence file, the media generation module 249 notifies the HTTP server 120 (e.g., request handler 221 via the media generator controller 225), and the HTTP server 120 (e.g., the request handler 221) responds to the media player 130 by fetching the generated media sequence file and providing it to the media player 130.

Illustration 3

Referring to FIGS. 2A, 2B, 3A and 4, in accordance with one aspect of the disclosure, an example of a process is illustrated for dynamically generating media sequence files in real time on demand.

At process 420, a media player 130 makes a request for a file (e.g., a media sequence file). This request may be a seeking request, which may occur when a user performs a seek operation (either a forward or backward seek) after the media has started to play. An HTTP server 120 (e.g., request handler 221) receives the request and upon receipt, the HTTP server 120 (e.g., 221) determines at process 430 whether the file exists, for example, in the media storage 260. If the file exists, then the HTTP server 120 obtains the file and returns the file to the media player 130 at process 490.

If the file does not exist, then a media generator configurator 223 may determine whether any change needs to be made to the configuration of the media generation module 249 at process 432. If no, then the operation may proceed to process 450. If yes, then the media generator configurator 223 changes the media generator configuration parameters and sends the new configuration parameters to a media generator controller 225, which informs the media generation module 249 of the new configuration at process.

At process 450, the controller 222 (e.g., 224, or 224 and 225) interprets the request and converts the request to a time format. At process 460, the media generation module 249 (e.g., 241) seeks to the corresponding time. At process 470, the media generation module 249 (e.g., 242, 243 and 244) creates the missing media sequence file in response to the request. At 480, the media generation module 249 notifies the HTTP server 120 (e.g., 221 via 225) that the missing media sequence file has been created. The HTTP server 120 (e.g., 221) then fetches the media sequence file that has been created and provides it to the media player 130.

Illustration 4

Referring to FIGS. 2A and 2B, in accordance with one aspect of the disclosure, described below is an example of a process of dynamically generating media sequence files.

(i) A media generation module 249 starts creating a playlist file (e.g., playlist file A in FIG. 3E) and determines the number of media sequence files to be generated. For this example, the media generation module 249 needs to create 12 media sequence files.

(ii) The media generation module 249 starts creating the media sequence files in sequence starting from file1.ts, as shown below in Table 1.

TABLE 1

| file1.ts | file2.ts |
|---|---|

(iii) After the media generation module 249 creates media sequence file2.ts, if a media player 130 makes a forward seek request, then the position computing module 224 receives this request via 221 and 225). In response to the request, the position computing module 224 determines that this seek request corresponds to file9.ts, and the media generation module 249 starts creating media sequence file9.ts (as this was not previously created). When file9.ts is created, the media generation module 249 may inform the HTTP server 120 (e.g., request handler 221 via media generator controller 225), and the HTTP server 120 (e.g., 221) may provide file9.ts to the media player. After file9.ts is created, the media generation module 249 may continue to create the next media sequence files in sequence (e.g., file10.ts and file11.ts as shown in Table 2), which can be provided to the media player in a manner similar to file9.ts.

TABLE 2

| file1.ts | file2.ts | file9.ts | file10.ts | file11.ts |
|---|---|---|---|---|

(iv) After the media generation module 249 creates media sequence file11.ts, if the media player 130 makes a backward seek request, then the position computation module 224 receives this request. In response to the request, the position computation module 224 determines that this seek request corresponds to file6.ts, and the media generation module 249 starts creating media sequence file6.ts, which can be provided to the media player in a manner similar to file9.ts. After file6.ts is created, the media generation module 249 may continue to create the next media sequence files in sequence (e.g., file7.ts and file8.ts as shown in Table 3), which can be provided to the media player in a manner similar to file9.ts.

(v) The media generation module 249 does not create a media sequence file if it is already generated. For example, after creating file6.ts, file7.ts and file8.ts, the media generation module creates file12.ts (as shown in Table 3), and the media generation module skips creation of (or refrains from creation of) file9.ts, file10.ts and file11.ts since they were previously created.

TABLE 3

| file1.ts | file2.ts | file6.ts | file7.ts | file8.ts | file9.ts | file10.ts | file11.ts | file12.ts |
|---|---|---|---|---|---|---|---|---|

(vi) After the media generation module 249 creates media sequence file12.ts, if the media player 130 makes a backward seek request to file1.ts, then the media generation module does not create file1.ts as it already exists and starts creating media sequence files from file3.ts and continues to create other media sequence files in sequence, such as file4.ts and file5.ts (as shown in Table 4), as these were not previously created.

TABLE 4

| file1.ts | file2.ts | file3.ts | file4.ts | file5.ts | file6.ts | file7.ts | file8.ts | file9.ts | file10.ts | file11.ts | file12.ts |
| --- | --- | --- | --- | --- | --- | --- | --- | --- | --- | --- | --- |

Illustration 5

Referring to FIGS. 2A, 2B, 3A-3E and Tables 1-4 shown for Illustration 4 above, in accordance with one aspect of the disclosure, an example of media playback and seeking operations is illustrated.

Initial Setup Process

A media playback process may begin when a remote media player 130 selects a name of a file (e.g., 320A) and sends an initial request to a web server to stream media for the selected file. At the time of receipt of the initial request, a request handler 221 (or another component) may determine whether the selected media source file is compatible with the media player. If there are other media files, which correspond to the selected media source file in various formats (e.g., H.264.mid_quality format, H.264.high_quality format, H.264.low_quality format), then the request handler 221 (or another component) may also determine whether any such media files are compatible with the media player. If there are no media source file or media files that are compatible with the media player, a setup interface 226 may be invoked (e.g., via request handler 226 or another channel) for initial setup.

During the initial setup process, the setup interface 226 may determine (i) the location of the media source file (e.g., media source file 1 in FIG. 3D) associated with the selected filename (e.g., 320A) to be used by a source reader 241 and (ii) the location(s) to store the media file (e.g., media file A comprising playlist file A and media sequence files A-1 through A-N) associated with the media source file to be used by a writer 244.

During the initial setup process, a media generator configurator 223 may receive the medial player's configuration information and generate configuration parameters for a media generation module 249 (e.g., to be used by the decoder 242 and the encoder 243). A media generator controller 225 may provide to the media generation module 249 the setup information from the setup interface 226 and the configuration parameters from the media generator configurator 223. The media generation module 249 uses the setup information and the configuration parameters in the process of generating the media file (e.g., media file A in FIG. 3E).

The media generation module 249 may then locate the media source file from a media source 250, determine the duration of the media source file, the total number of media sequence files required and start generating a playlist file. The media generation module 249 may insert information about the media source file, the media sequence files and the contents of the media source file/media sequence files into the playlist file, including, for example, some or all of the following: the duration of the media source file, the total number of media sequence files, the names and locations of the media source file and the media sequence files. When the media player 130 queries for the playlist file, the HTTP server 120 (e.g., request handler 221) may, in response, fetch the playlist file and provide it to the media player 130.

Change in Configuration Information

When the media player's configuration information changes (e.g., network quality or network bandwidth has changed), the media generator configurator 223 may detect these changes (e.g., via the request handler 1 and media generator controller 225 or via another channel). Upon detection, the media generator configurator 223 may adjust the configuration parameters of the media generation module 249 (e.g., decoder 242 and/or encoder 243) based on the change(s) in the media player's configuration information. For example, the video bit rate and audio bit rate may be adjusted accordingly. The updated configuration parameters may be provided, to the media generation module 249 (e.g., decoder 242 and/or encoder 243) via the media generator controller 225. The media generation module 249 (e.g., decoder 242 and/or encoder 243) may use the updated configuration parameters as they generate the media sequence files.

Seeking Media Sequences

After receiving the playlist file, the media player 130 may then send to the HTTP server 120 (e.g., 221) a request for a media sequence file listed, on the playlist file. The media player 130 may send a request for a media sequence file in sequential order (e.g., file1.ts, file2.ts, etc.), send a forward seek request for a media sequence file (e.g., file9.ts), or send a backward seek request for a media sequence file (e.g., file6.ts). The media player 130 may typically send a request for a media sequence file in sequential order unless it is forward or backward seeking. For each request for a media sequence file, the HTTP server 120 (e.g., 221) may determine whether the requested media sequence file exists (e.g., in 260). If the HTTP server 120 (e.g., 221) determines that the file exists (e.g., in 260), then the HTTP server 120 (e.g., 221) may fetch and provide the fetched file to the media player 130 without re-creating the file.

If the HTTP server 120 (e.g., 221) determines that the file is missing, then the HTTP server 120 (e.g., 221) may provide the request to the controller 222 (e.g., 225).

A media generator controller 225 may receive the request, determine that the request is a request for a media sequence file, and forward the request to the position computation module 224. The position computation module 224 may determine a time (e.g., 40 seconds) of the media source file that corresponds to the requested media sequence file (e.g., file9.ts) and convert the request into the time. The position computation module 224 may provide the time to the media generator controller 225, which may then send a request to the media generation module 249 to seek to the time (e.g., 40 seconds) of the media source file, read the media source file from the time and create the media sequence file.

As soon as the requested media sequence file is created, the HTTP server 120 (e.g., 221 via 225) may be notified by the media generation module 249, and the HTTP server 120 (e.g., 221) may fetch the requested media sequence file and provide it to the media player 130.

Because the HTTP server 120 (e.g., 221) makes a determination first as to whether each requested file exists, if a file already exists, such file is not re-created by the media generation module 249, thus providing efficient resource utilization.

For example, in the Illustration 4 described above, after creating file6.ts, file7.ts and file8.ts in response to the corresponding requests from the media player 130, when the media player 130 requests for media sequence file9.ts, the HTTP server 120 (e.g., 221) determines that file9.ts exists and thus can simply fetch and provide it to the media player 130 without having the media generation module 249 re-create file9.ts. In a similar fashion, when the media player 130 requests for file10.ts and file11.ts in sequence, the HTTP server 120 (e.g., 221) performs similar actions and simply provides these files without having these files re-created. When the media player 130 makes a backward seek request for file1.ts after creation of file12.ts, the HTTP server 120 (e.g., 221) again performs similar actions and simply provides the requested file1.ts without having the file re-created.

In one aspect, a media source file preexists in the media source (e.g., 250) before the media player selects a media filename to play and sends an initial request to a server (e.g., 120) to play media of the media source file associated with the selected filename. The media source file is maintained in the media source and is not sent to the media player during the entire playback of the media. The playlist file and the media sequence files may not yet exist when the media player makes the initial request. The playlist file may be generated in response to the initial request and may be provided to the media player in response to the initial request. Each media sequence file may be generated and provided to the media player in response to an individual request for the corresponding media sequence file.

Example of Computing Device

Figure 5:
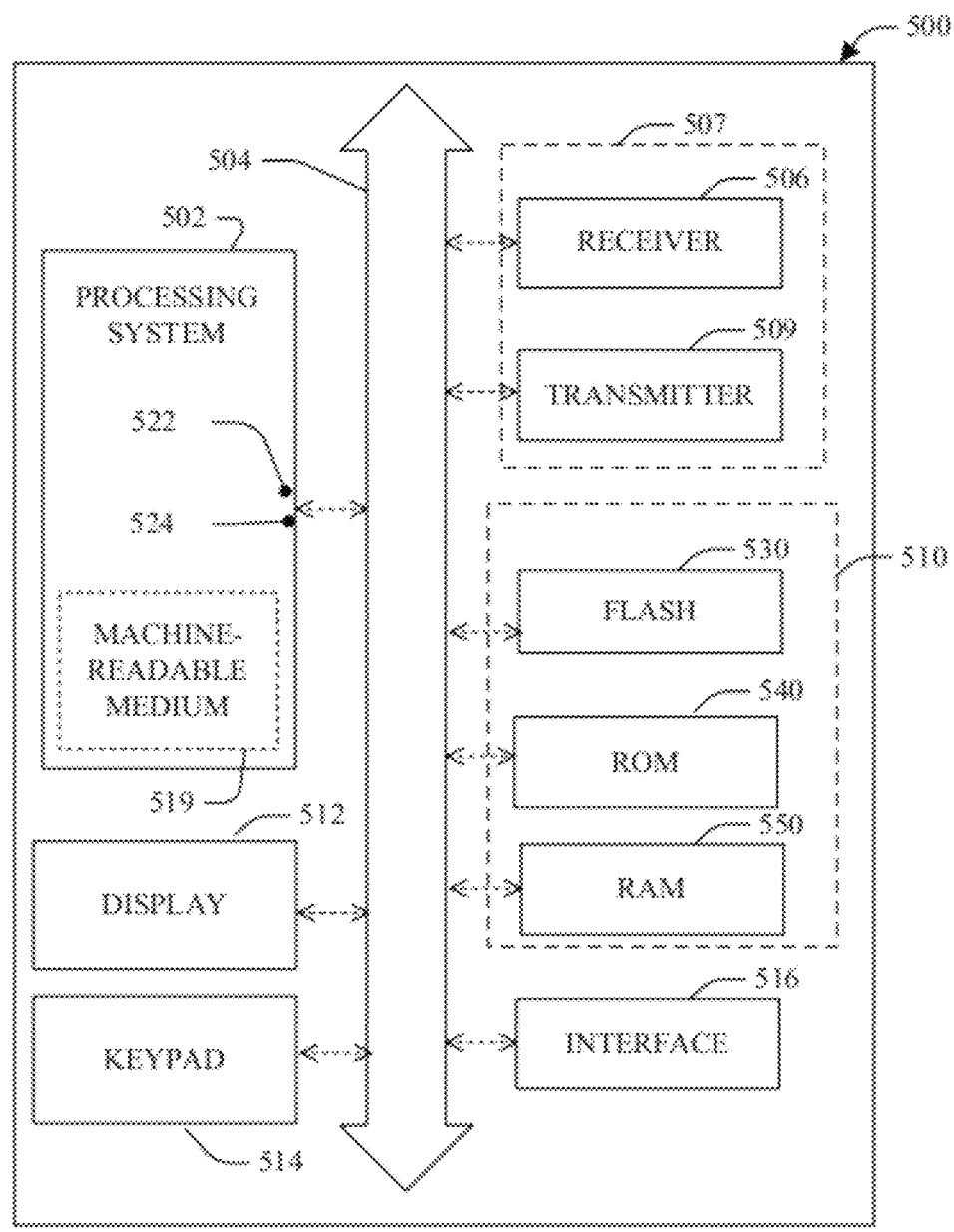
FIG. 5 is a conceptual block diagram illustrating an example of a computing device.

FIG. 5 is a conceptual block diagram illustrating an example of a computing device.

In one aspect, a computing device 500 may be, for example, a media player 130, an HTTP server 120, a media generator 240, a media generation module 249, or a computing device 280, 290, 602 or 604, a portion thereof and/or a combination thereof. A computing device may comprise one or more computing devices.

A computing device 500 may include a processing system 502. A processing system may include one or more processors. The processing system 502 is capable of communication with a receiver 506 and a transmitter 508 through a bus 504 or other structures or devices. It should be understood that communication means other than busses can be utilized with the disclosed configurations. The processing system 502 can generate audio, video, multimedia, and/or other types of data to be provided to the transmitter 509 for communication. In addition, audio, video, multimedia, and/or other types of data can be received at the receiver 506, and processed by the processing system 502. A processor may include one or more processors.

The processing system 502 may include a general-purpose processor or a specific-purpose processor for executing instructions and may further include a machine-readable medium 519 for storing data and/or instructions for software programs. The instructions, which may be stored in a machine-readable medium 510 and/or 519, are executable by the processing system 502 to control and manage access to the various networks, as well as provide other communication and processing functions. The instructions may also include instructions executable by the processing system 502 for various user interface devices, such as a display 512 and a keypad 514. The processing system 502 may include an input port 522 and an output port 524. Each of the input port 522 and the output port 524 may include one or more ports. The input port 522 and the output port 524 may be the same port a bi-directional port) or may be different ports.

The processing system 502 may be implemented using software, hardware, or a combination of both. By way of example, the processing system 502 may be implemented with one or more processors. A processor may be a general-purpose microprocessor, a microcontroller, a digital signal processor (DSP), an application specific integrated circuit (ASIC), a field programmable gate array (FPGA), a programmable logic device (PLD), a controller, a state machine, gated logic, discrete hardware components, and/or any other suitable device that can perform calculations or other manipulations of information. Those skilled in the art will recognize how best to implement the described functionality for the processing system 502.

Software shall be construed broadly to mean instructions, data, or any combination thereof, whether referred to as software, firmware, middleware, microcode, hardware description language, or otherwise. Instructions may include code (e.g., in source code format, binary code format, executable code format, or any other suitable format of code). Instructions may be executable, for example, by a computing device (e.g., a media player, an HTTP server, a web server) or by a processing system (e.g., a processing system of a media player, an HTTP server, or a web server). Instructions can be, for example, a computer program including code.

A machine-readable medium can be one or more machine-readable media. A machine-readable medium (e.g., 510) may include storage external to a processing system, such as a random access memory (RAM) 550, a flash memory 530, a read only memory (ROM) 540, a programmable read-only memory (PROM), an erasable PROM (EPROM), registers, a hard disk, a removable disk, a CD-ROM, a DVD, or any other suitable storage device. A machine-readable medium 519 may also have a volatile memory, and a non-volatile memory. A machine-readable medium 519 may include storage integrated into a processing system, such as might be the case with an application specific integrated circuit (ASIC). A memory may be a machine-readable medium (e.g., 510 or 519) or a part thereof. A machine-readable medium may include, for example, a media source 250 or a media storage 260.

According to one aspect of the disclosure, a machine-readable medium is a computer-readable medium encoded or stored with instructions and is a computing element, which defines structural and functional interrelationships between the instructions and the rest of the computing device, which permit the instructions' functionality to be realized. In one aspect, a machine-readable medium is a non-transitory machine-readable medium, a machine-readable storage medium, or a non-transitory machine-readable storage medium. In one aspect, a machine-readable medium is a computer-readable medium, a non-transitory computer-readable medium, a computer-readable storage medium, or a non-transitory computer-readable storage medium.

An interface 516 may be any type of interface and may reside between any of the components shown in FIG. 5. An interface 516 may also be, for example, an interface to the outside world (e.g., an Internet network interface). A transceiver block 507 may represent one or more transceivers, and each transceiver may include a receiver 506 and a transmitter 509. A functionality implemented in a processing system 502 may be implemented in a portion of a receiver 506, a portion of a transmitter 509, a portion of a machine-readable medium 510, a portion of a display 512, a portion of a keypad 514, or a portion of an interface 516, and vice versa. In one aspect, a computing device may include only some or all of the elements shown in FIG. 5. A computing device may include other elements not shown in FIG. 5. A computing device may include more than one of the same elements.

Example of Network System

Figure 6:
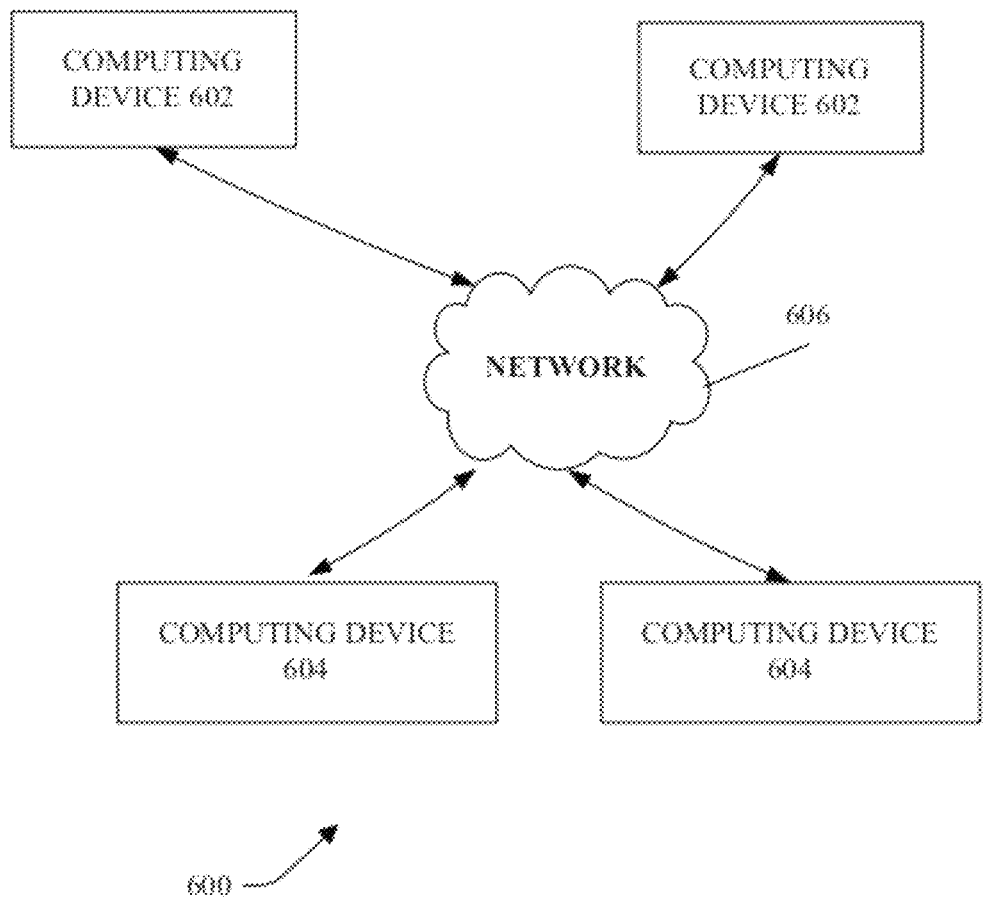
FIG. 6 illustrates a simplified diagram of an example of a network system.

FIG. 6 illustrates a simplified diagram of an example of a computer network system in accordance with an aspect of the present disclosure.

A computer network system 600 may include one or more computing devices 602 (e.g., a client device such as 130 or 280) in communication with one or more computing devices 604 (e.g., a server such as 120 or 290) via a network 606. In one aspect, a computing device 604 is configured to allow remote sessions (e.g., remote desktop sessions) wherein users can access applications and files on the computing device 604 by logging onto the computing device 604 from a computing device 602. Such a connection may be established using any of several well-known techniques such as the remote desktop protocol (RDP) on a Windows-based server.

By way of illustration and not limitation, a computing device 602 can represent a computer, a mobile phone, a laptop computer, a tablet, a thin computing device, a personal digital assistant (PDA), a portable computing device, a virtual machine, or a suitable device with a processor. In one example, a computing device 602 is a smartphone (e.g., iPhone, Android phone, Blackberry, etc.). In certain configurations, a computing device 602 can represent an audio player, a game console, a camera, a camcorder, an audio device, a video device, a multimedia device, or a device capable of supporting a connection to a remote computing device. In an advantageous example, a computing device 602 is mobile. In another advantageous example, a computing device 602 is a hand-held device. In another example, a computing device 602 can be stationary. In one example, a computing device 602 may be a device having at least a processor and memory, where the total amount of memory of the computing device 602 is less than the total amount of memory in a computing device 604. In an advantageous example, a computing device 602 does not have a hard disk. In one advantageous aspect, a computing device 602 has a display smaller than a display supported by a computing device 604.

In one aspect, a computing device 604 may represent a computer, a laptop computer, a computing device, a virtual machine (e.g., VMware® Virtual Machine), a desktop session (e.g., Microsoft Terminal Server), a published application (e.g., Microsoft Terminal Server) or a suitable device with a processor. In one aspect, a computing device 604 can be stationary. In another aspect, a computing device 604 can be mobile. In certain configurations, a computing device 604 may be any device that can represent a computing device. In one aspect, a computing device 604 may include one or more computing devices.

In one example, a first device is remote to a second device when the first device is not directly connected to the second device. In one example, a first remote device may be connected to a second device over a communication network (e.g., 606).

When a computing device 602 and a computing device 604 are remote with respect to each other, a computing device 602 may connect to a computing device 604 over a network 606, for example, via a modem connection, a LAN connection including the Ethernet or a broadband WAN connection including DSL, Cable, T1, T3, Fiber Optics, Wi-Fi, or a mobile network connection including GSM, GPRS, 3G, WiMax or other network connection. A network 606 can be a LAN network, a WAN network, a wireless network, the Internet, an intranet or other network. A remote device (e.g., a computing device) on a network may be addressed by a corresponding network address, such as, but not limited to, an Internet protocol (IP) address, an Internet name, a Windows Internet name service (WINS) name, a domain name or other system name. These illustrate some examples as to how one device may be remote to another device. However, the subject technology is not limited to these examples.

Illustration of Phrases

In one aspect, the terms "local" and "remote" are relative terms, and a computing device may be referred to as a local computing device or a remote computing device, depending on whether a computing device is on the same side (local) of a network or on another side (remote) of the network. In one preferred aspect, a media player 130 or a computing device 280 is remote to a computing device 290, an HTTP server 120, a media generator 240 (e.g., 290). In one aspect, components 120, 240, 250 and 260 are local to each other. In another aspect, these components may be remote to at least some of them.

In one aspect, media may refer to a media file and vice versa. In one aspect, a media file may refer to a media sequence, a media sequence file, a media source file, or a playlist file. In one aspect, a media sequence may refer to a media sequence file. In one aspect, a media sequence may refer to a clip and vice versa. In one aspect, a file may refer to a media file. In one advantageous aspect, a media comprises one or more of text, audio, still images, animation, video, and interactivity content forms. In one aspect, a media comprises audio and video. In one aspect, a media comprises audio, in one aspect, a media comprises video. In one aspect, metadata comprises information about a file or about the contents of a file.

In one aspect, an HTTP server is a computing device. In one aspect, an HTTP server is a web server. In one aspect, an HTTP server is a server.

In one aspect, HTTP is a request/response protocol. A first computing device (e.g., client) may send a request to a second computing device (e.g., server) in the form of, for example, a request method, a uniform resource identifier (URI), a protocol version, a message containing request modifiers, information about the computing device and a body content. The second computing device may then send a response to the request to the first computing device.

In one aspect, streaming may refer to a sequence of data elements made available over time. In one aspect, live streaming may transmit or broadcast a media live (or in real-time over a network such as the Internet. In one aspect, real-time may refer to near real-time.

In one aspect, dynamically generating media sequence files on demand allows media sequence files to be generated in response to corresponding requests (rather than being generated prior to the requests) and be generated in real time so that a user who makes the requests can view the media sequence files in real time seamlessly. In one aspect, a media sequence file may be 3 to 10 seconds long and may be generated dynamically in less than one minute (e.g., 2 to 3 seconds) of receipt of a request (depending on computing power).

In a preferred aspect, the subject technology utilizes HTTP live streaming without modifying the HTTP live streaming protocol. The current specification for HTTP live streaming described by Informational Internet-Draft titled "HTTP Live Streaming", Panthos, R. and May, W., Mar. 31, 2011, IETF Trust, is known to those skilled in the art and is incorporated herein by reference.

Illustration of Advantages

According to various aspects, the subject technology provides, among others, the following advantages and benefits: (i) media seeking for HTTP live streaming from a media source without modifying the HTTP live streaming protocol; (ii) controlling the media seeking operation independently of the media player and without requiring modifications to the media player; (iii) efficient resource utilization when generating media sequence files; and (iv) enabling a remote media player to initiate playing one or more media sequence files and allowing forward/backward seek operations on the media player, prior to generating all of the media sequence files at the media location.

In an important advantageous aspect, because a position computation module 224 (or 224 with 225) can determine the position of the media source file in response to a request for a media sequence file, the position computation module (or 224 with 225) can provide the various advantages described above.

In an important advantageous aspect, because the request handler 221 can check each request for a media sequence file and determine whether the requested media sequence file exists, this can obviate re-creating a media sequence file that may already exist at the media location (e.g., 290, 260). Accordingly, during a forward/back seek operation of a media player, the request handler 221 can determine whether to create a requested media sequence file or skip creation of the requested media sequence file, as also discussed with reference to Tables 4 and 5. By refraining from creating existing files, the request handler 221 can provide efficient resource utilization when generating media sequence files and other advantages described above. In an advantage aspect, the determination operation is performed prior to any operations to facilitate generating and providing the media sequence file (e.g., adjusting any configuration parameters, determining the position of the media source file that corresponds to the media sequence file, seeking to the position of the media source file, generating the media sequence file, notifying that the media sequence file is generated, fetching the media sequence file, providing the media sequence file to the media player).

Illustration of Subject Technology as Clauses

The subject technology is illustrated, for example, according to various aspects described below. Various examples of aspects of the subject technology are described as numbered clauses (1, 2, 3, etc.) for convenience. These are provided as examples, and do not limit the subject technology.

Examples of Method Clauses

Figure 7A:
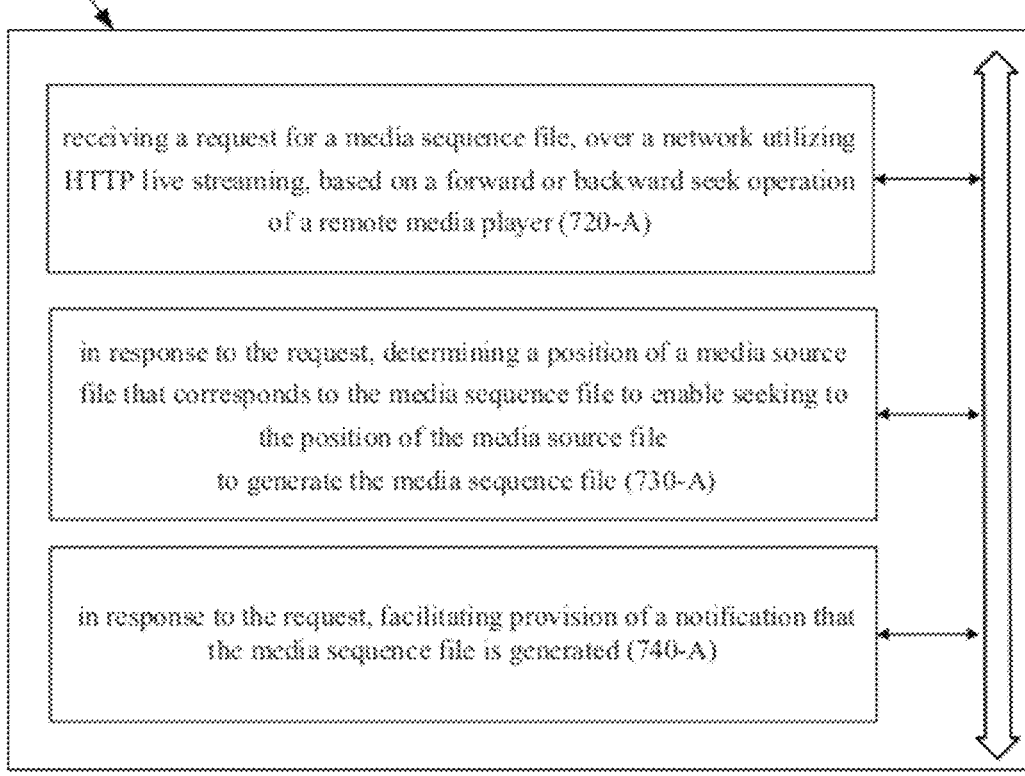
FIG. 7A is a block diagram representing an example of a method of operation in accordance with one aspect of the disclosure.

1. A method (see, e.g., 710-A in FIG. 7A) for dynamically generating media sequence files on demand for hypertext transfer protocol (HTTP) live streaming, comprising:

receiving a request for a media sequence file, over a network utilizing HTTP live streaming; based on a forward or backward seek operation of a remote media player (see, e.g., 720 in FIG. 7A);

in response to the request,
  determining a position of a media source file that corresponds to the media sequence file to enable seeking to the position of the media source file to generate the media sequence file from the media source file (see, e.g., 730 in FIG. 7A);
  facilitating provision of a notification that the media sequence file is generated (see, e.g., 740 in FIG. 7A),
  wherein the media sequence file represents one of a plurality of sequential portions of the media source file,
  wherein a format of the media sequence file is different from a format of the media source file,
  wherein the format of the media sequence file is compatible with the remote media player.

2. The method of clause 1, further comprising:
in response to the request,
  making a determination as to whether the media sequence file exists to obviate re-creation of any existing media sequence files,
  if the determination indicates that the media sequence file exists, then allowing fetching of the media sequence file and providing the fetched media sequence file without generating the media sequence file, and
  if the determination indicates that the media sequence file does not exist, then allowing performing the determination of the position of the media source file and performing the facilitation of provision of the notification.

3. The method of clause 1, wherein the position of the media source file is a time corresponding to the media sequence file.

4. The method of clause 1, further comprising:
in response to a request for each media sequence file, making a determination as to whether each requested media sequence file exists,
wherein the determining the position of the media source file and the facilitating provision of the notification are performed only when the media sequence file is missing.

5. The method of clause 1, further comprising:
detecting a change in the remote media player's playback configuration;
adjusting, based on the detected change, one or more configuration parameters for generating the media sequence file.

6. The method of clause 5, further comprising:
facilitating generation of the media sequence file using the adjusted one or more configuration parameters.

7. The method of clause 1, further comprising:
prior to receiving the request for the media sequence file, receiving an initial request from the remote media player to play media of the media source file;
in response to the initial request, performing an initial setup process, comprising:
  determining a location of the media source file;
  determining one or more locations for storing a playlist file and media sequence files associated with the media source file;
  generating configuration parameters for generating the media sequence files based on the remote media player's playback configuration information.

8. The method of clause 7, wherein the initial setup process further comprises:
determining a total number of the media sequence files to be generated for the media source file;
generating the playlist file comprising names of the media sequence files,
wherein the media source file is not compatible with the remote media player,
wherein the playlist file and the media sequence files are compatible with the remote media player,
wherein the media sequence file requested is one of the media sequence files listed, on the playlist file.

9. The method of clause 1, further comprising:
facilitating creation of a playlist file for the media source file;
facilitating determination of a total number of media sequence files to be generated for the media source file;
enabling the remote media player to initiate playing at least one of the media sequence files and allowing a forward or backward seek operation, prior to creating all of the media sequence files for the media source file.

10. The method of clause 1, further comprising:
prior to receiving the request for the media sequence file, receiving an initial request from the remote media player to play media of the media source file;
in response to the initial request,
determining a total number of media sequence files to be generated for the media source file;
generating a playlist file comprising names of the media sequence files and the total number of the media sequence files;
facilitating provision of the playlist file to the remote media player,
wherein the determining the position of the media source file comprises determining the position of the media source file based on information in the playlist file.

11. The method of clause 1, further comprising:
facilitating generation of media sequence files for the media source file and facilitating provision of the media sequence files to the remote media player,
wherein the operations of facilitating generation of the media sequence files and facilitating provision of the media sequence files are performed independently of the remote media player and without modifying the remote media player,
wherein the operations of determining the position of the media source file and facilitating provision of the notification are performed independently of the remote media player and without modifying the remote media player.

12. The method of clause 1, further comprising:
in response to the request, converting the request to a time and generating the media source file from the time of the media source file;
skipping creation of a media sequence file that already exists, 13. The method of clause 1, further comprising:
facilitating provision of media sequence files to the remote media player over the network utilizing HTTP live streaming, wherein the network comprises one or more of the Internet and a wireless network.

14. The method of clause 2, wherein the receiving the request is performed by one or both of a request handler and a media generator controller, wherein the determining the position of the media source file is performed by a position computation module or by the position computation module and the media generator controller, wherein the facilitating provision of the notification is performed by one or both of the media generator controller and a media generation module, wherein the making the determination is performed by the request handler, wherein the request handler, the media generator controller and the media generation module are remote to the remote media player.

15. The method of clause 6, wherein the detecting is performed by one or both of a media generator configurator and a media generator controller, wherein the adjusting is performed by the media generator configurator, wherein the facilitating generation of the media sequence file is performed by at least one or more of the media generator configurator, the media generator controller and a media generation module, wherein the media generator configurator, the media the generator controller and the media generation module are remote to the remote media player.

16. The method of clause 8, wherein the receiving the initial request is performed by one or more of a request handler, a media generator controller and a setup interface, wherein the determining the location and the determining the one or more locations are performed by the setup interface, wherein the generating configuration parameters is performed by a media generator configurator, wherein the determining the total number is performed by at least one of a media generation module and the media generator controller, wherein the generating the playlist file is performed by the media generation module, wherein the request handler, the media generator controller, the setup interface, the media generator configurator and the media generation module are remote to the remote media player.

17. The method of clause 9, wherein the enabling comprises: determining whether the media sequence file exists, and determining of the position if the media sequence file does not exist, wherein the enabling is performed by at least some of a request handler, a media generator controller and a position computation module that are remote to the remote media player.

18. The method of clause 11, wherein the facilitating generation of the media sequence files is performed by at least some of a media generation module, a media generator controller and a position computation module, wherein the facilitating provision of the media sequence files is performed by at least some of the media generation module, the media generator controller and a request handler.

19. The method of clause 12, wherein the converting the request is performed by a position computation module and the skipping is performed by a request handler.

Examples of Machine-Readable Medium Clauses

Figure 7B:
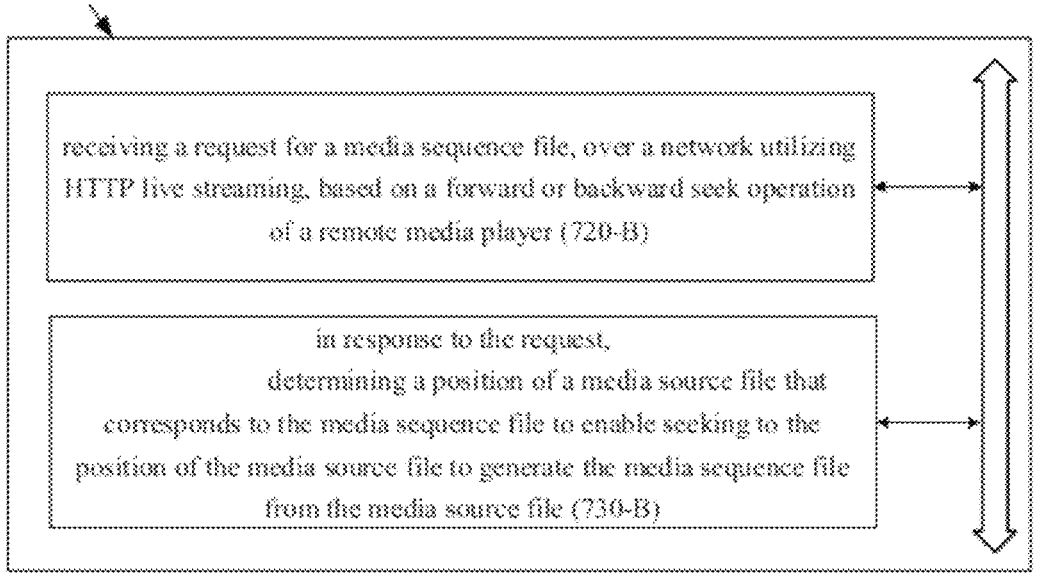
FIG. 7B is a block diagram representing an example of a machine-readable medium in accordance with one aspect of the disclosure.

20. A machine-readable storage medium (see, e.g., 710-B in FIG. 7B) encoded with instructions executable by one or more processors to perform one or more operations, the one or more operations comprising:
receiving a request for a media sequence file, over a network utilizing hypertext transfer protocol (HTTP) live streaming, based on a forward or backward seek operation of a remote media player (see, e.g., 720-B in FIG. 7B);
in response to the request,
determining a position of a media source file that corresponds to the media sequence file to enable seeking to the position of the media source file to generate the media sequence file from the media source file (see, e.g., 730-B in FIG. 7B),
wherein the media sequence file represents one of a plurality of sequential portions of the media source file,
wherein a format of the media sequence file is different from a format of the media source file,
wherein the format of the media sequence file is compatible with the remote media player.

21. The machine-readable storage medium of clause 20, wherein the one or more operations comprise:
in response to the request,
making a determination as to whether the media sequence file exists to obviate re-creation of any existing media sequence files,
if the determination indicates that the media sequence file exists, then allowing fetching of the media sequence file and providing the fetched media sequence file without generating the media sequence file, and
if the determination indicates that the media sequence file does not exist, then allowing performing the determination of the position of the media source file and facilitating provision of a notification that the media sequence file is generated.

22. The machine-readable storage medium of clause 20, wherein the position of the media source file is a time corresponding to the media sequence file.

23. The machine-readable storage medium of clause 20, wherein the one or more operations comprise:

in response to a request for each media sequence file, making a determination as to whether each requested media sequence file exists, wherein the determining the position of the media source file, and facilitating provision of a notification that the media sequence file is generated, are performable only when the media sequence file is missing.

24. The machine-readable storage medium of clause 20, wherein the one or more operations comprise:

detecting a change in the remote media player's playback configuration;

adjusting, based on the detected change, one or more configuration parameters for generating the media sequence file.

25. The machine-readable storage medium of clause 24, wherein the one or more operations comprise:

facilitating generation of the media sequence file based on the adjusted one or more configuration parameters.

26. The machine-readable storage medium of clause 20, wherein the one or more operations comprise:

prior to receiving the request for the media sequence file, receiving an initial request from the remote media player to play media of the media source file;

in response to the initial request, performing an initial setup process, comprising:

determining a location of the media source file;

determining one or more locations for storing a playlist file and media sequence files associated with the media source file;

generating configuration parameters for generating the media sequence files based on the remote media player's playback configuration information, 27. The machine-readable storage medium of clause 26, wherein the initial setup process further comprises:

determining a total number of the media sequence files to be generated for the media source file;

generating the playlist file comprising names of the media sequence files, wherein the media source file is not compatible with the remote media player, wherein the playlist file and the media sequence files are compatible with the remote media player, wherein the media sequence file requested is one of the media sequence files listed, on the playlist file.

28. The machine-readable storage medium of clause 20, wherein the one or more operations comprise:

facilitating creation of a playlist file for the media source file;

facilitating determination of a total number of media sequence files to be generated for the media source file;

enabling the remote media player to initiate playing at least one of the media sequence files and allowing a forward or backward seek operation, prior to creating all of the media sequence files for the media source file.

29. The machine-readable storage medium of clause 20, wherein the one or more operations comprise:

prior to receiving the request for the media sequence file, receiving an initial request from the remote media player to play media of the media source file;

in response to the initial request, determining a total number of media sequence files to be generated for the media source file;

generating a playlist file comprising names of the media sequence files and the total number of the media sequence files;

facilitating provision of the playlist file to the remote media player, wherein the determining the position of the media source file comprises determining the position of the media source file based on information in the playlist file.

30. The machine-readable storage medium of clause 20, wherein the one or more operations comprise:

facilitating generation of media sequence files for the media source file and facilitating provision of the media sequence files to the remote media player, wherein the operations, of facilitating generation of the media sequence files and facilitating provision of the media sequence files, are performable independently of the remote media player and without modifying the remote media player, wherein the operations, of determining the position of the media source file and facilitating provision of a notification that the media sequence file is generated, are performable independently of the remote media player and without modifying the remote media player.

31. The machine-readable storage medium of clause 20, wherein the one or more operations comprise:

in response to the request, converting the request to a time and generating the media source file from the time of the media source file;

skipping creation of a media sequence file that already exists.

32. The machine-readable storage medium of clause 20, wherein the one or more operations comprise:

facilitating provision of media sequence files to the remote media player over the network utilizing HTTP live streaming, wherein the network comprises one or more of the Internet and a wireless network.

33. The machine-readable storage medium of clause 21, wherein the machine-readable storage medium comprises code for a request handler, a media generator controller, a position computation module, and a media generation module, wherein one or both of the request handler and the media generator controller comprise code for receiving the request, wherein the position computation module, or the position computation module and the media generator controller, comprise code for determining the position of the media source file, wherein one or both of the media generator controller and the media generation module comprise code for the operation of facilitating provision of the notification, wherein the request handler comprises code for making the determination, wherein the request handler, the media generator controller and the media generation module are remote to the remote media player.

34. The machine-readable storage medium of clause 25, wherein the machine-readable storage medium comprises code for a media generator configurator, a media generator controller, and a media generation module, wherein one or both of the media generator configurator and the media generator controller comprise code for the operation of detecting, wherein the media generator configurator comprises code for the operation of adjusting, wherein at least one or more of the media generator configurator, the media generator controller and the media generation module comprise code for the operation of facilitating generation of the media sequence file, wherein the media generator configurator, the media the generator controller and the media generation module are remote to the remote media player.

35. The machine-readable storage medium of clause 27, wherein the machine-readable storage medium comprises code for a request handler, a media generator controller, a setup interface, a media generator configurator, and a media generation module, wherein one or more of the request handler, the media generator controller and the setup interface comprise code for the operation of receiving the initial request, wherein the setup interface comprises code for the operations of determining the location and determining the one or more locations, wherein the media generator configurator comprises code for generating the configuration parameters, wherein at least one of the media generation module and the media generator controller comprises code for the operation of determining the total number, wherein the media generation module comprises code for generating the playlist file, wherein the request handler, the media generator controller, the setup interface, the media generator configurator and the media generation module are remote to the remote media player.

36. The machine-readable storage medium of clause 28, wherein the machine-readable storage medium comprises code for a request handler, a media generator controller and a position computation module that are remote to the remote media player, wherein the enabling comprises: determining whether the media sequence file exists and determining of the position if the media sequence file does not exist, wherein at least some of the request handler, the media generator controller and the position computation module comprise code for the operation of enabling.

37. The machine-readable storage medium of clause 30, wherein the machine-readable storage medium comprises code for a media generation module, a media generator controller, a position computation module, and a request handler, wherein at least some of the media generation module, the media generator controller and the position computation module comprise code for the operation of facilitating generation of the media sequence files, wherein at least some of the media generation module, the media generator controller and the request handler comprise code for the operation of facilitating provision of the media sequence files.

38. The machine-readable storage medium of clause 31, wherein the machine-readable storage medium comprises code for a request handler and a position computation module, wherein the position computation module comprises code for the operation of converting the request, wherein the request handler comprises code for the operation of skipping.

39. The machine-readable storage medium of clause 20, wherein the one or more operations comprise; in response to the request, facilitating provision of a notification that the media sequence file is generated.

Examples of Apparatus Clauses

Figure 7C:
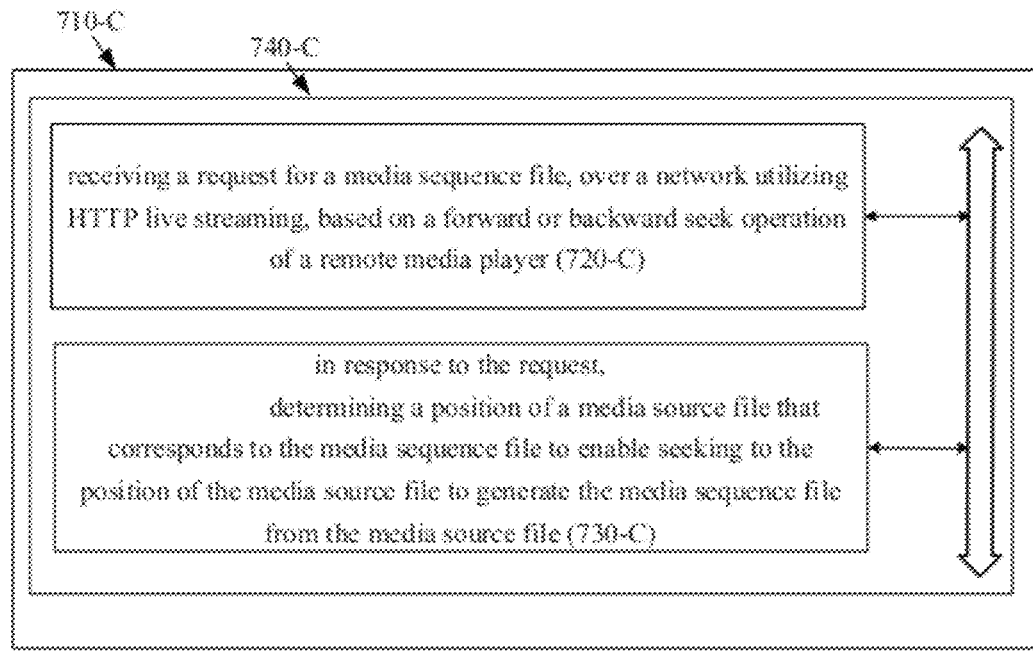
FIG. 7C is a block diagram representing an example of an apparatus in accordance with one aspect of the disclosure.

40. A hardware apparatus (see, e.g., 710-C in FIG. 7C), comprising:

one or more modules (see, 740-C in FIG. 7C) configured to perform one or more operations comprising:

receiving a request for a media sequence file, over a network utilizing hypertext transfer protocol (HTTP) live streaming, based on a forward or backward seek operation of a remote media player (see, e.g., 720-C in FIG. 7C);

in response to the request, determining a position of a media source file that corresponds to the media sequence file to enable seeking to the position of the media source file to generate the media sequence file from the media source file (see, e.g., 730-C in FIG. 7C), wherein the media sequence file represents one of a plurality of sequential portions of the media source file, wherein a format of the media sequence file is different from a format of the media source file, wherein the format of the media sequence file is compatible with the remote media player.

41. The hardware apparatus of clause 40, wherein the one or more operations comprise:

in response to the request, making a determination as to whether the media sequence file exists to obviate re-creation of any existing media sequence files, if the determination indicates that the media sequence file exists, then allowing fetching of the media sequence file and providing the fetched media sequence file without generating the media sequence file, and if the determination indicates that the media sequence file does not exist, then allowing performing the determination of the position of the media source file and facilitating provision of a notification that the media sequence file is generated.

42. The hardware apparatus of clause 40, wherein the position of the media source file is a time corresponding to the media sequence file.

43. The hardware apparatus of clause 40, wherein the one or more operations comprise:

in response to a request for each media sequence file, making a determination as to whether each requested media sequence file exists, wherein the determining the position of the media source file, and facilitating provision of a notification that the media sequence file is generated, are performable only when the media sequence file is missing.

44. The hardware apparatus of clause 40, wherein the one or more operations comprise:

detecting a change in the remote media player's playback configuration;

adjusting, based on the detected change, one or more configuration parameters for generating the media sequence file.

45. The hardware apparatus of clause 44, wherein the one or more operations comprise:

facilitating generation of the media sequence file based on the adjusted one or more configuration parameters.

46. The hardware apparatus of clause 40, wherein the one or more operations comprise:

prior to receiving the request for the media sequence file, receiving an initial request from the remote media player to play media of the media source file;

in response to the initial request, performing an initial setup process, comprising:

determining a location of the media source file;

determining one or more locations for storing a playlist file and media sequence files associated with the media source file;

generating configuration parameters for generating the media sequence files based on the remote media player's playback configuration information.

47. The hardware apparatus of clause 46, wherein the initial setup process further comprises:

determining a total number of the media sequence files to be generated for the media source file;

generating the playlist file comprising names of the media sequence files, wherein the media source file is not compatible with the remote media player, wherein the playlist file and the media sequence files are compatible with the remote media player, wherein the media sequence file requested is one of the media sequence files listed on the playlist file.

48. The hardware apparatus of clause 40, wherein the one or more operations comprise:

facilitating creation of a playlist file for the media source file;

facilitating determination of a total number of media sequence files to be generated for the media source file;

enabling the remote media player to initiate playing at least one of the media sequence files and allowing a forward or backward seek operation, prior to creating all of the media sequence files for the media source file.

49. The hardware apparatus of clause 40, wherein the one or more operations comprise:

prior to receiving the request for the media sequence file, receiving an initial request from the remote media player to play media of the media source file;

in response to the initial request,
determining a total number of media sequence files to be generated for the media source file;
generating a playlist file comprising names of the media sequence files and the total number of the media sequence files;
facilitating provision of the playlist file to the remote media player, wherein the determining the position of the media source file comprises determining the position of the media source file based on information in the playlist file.

50. The hardware apparatus of clause 40, wherein the one or more operations comprise:

facilitating generation of media sequence files for the media source file and facilitating provision of the media sequence files to the remote media player, wherein the operations, of facilitating generation of the media sequence files and facilitating provision of the media sequence files, are performable independently of the remote media player and without modifying the remote media player, wherein the operations, of determining the position of the media source file and facilitating provision of a notification that the media sequence file is generated, are performable independently of the remote media player and without modifying the remote media player.

51. The hardware apparatus of clause 40, wherein the one or more operations comprise:

in response to the request, converting the request to a time and generating the media source file from the time of the media source file;

skipping creation of a media sequence file that already exists.

52. The hardware apparatus of clause 40, wherein the one or more operations comprise:

facilitating provision of media sequence files to the remote media player over the network utilizing HTTP live streaming, wherein the network comprises one or more of the Internet and a wireless network.

53. The hardware apparatus of clause 41, wherein the one or more modules comprise a request handler, a media generator controller, a position computation module, and a media generation module, wherein one or both of the request handler and the media generator controller are configured to perform the operation of receiving the request, wherein the position computation module, or the position computation module and the media generator controller, are configured to perform the operation of determining the position of the media source file, wherein the request handler is configured to perform the operation of making the determination, wherein the request handler, the media generator controller and the media generation module are remote to the remote media player.

54. The hardware apparatus of clause 45, wherein the one or more modules comprise a media generator configurator, a media generator controller, and a media generation module, wherein one or both of the media generator configurator and the media generator controller are configured to perform the operation of detecting, wherein the media generator configurator is configured to perform the operation of adjusting, wherein at least one or more of the media generator configurator, the media generator controller and the media generation module are configured to perform the operation of facilitating generation of the media sequence file, wherein the media generator configurator, the media the generator controller and the media generation module are remote to the remote media player.

55. The hardware apparatus of clause 47, wherein the one or more modules comprise a request handler, a media generator controller, a setup interface, a media generator configurator, and a media generation module, wherein one or more of the request handler, the media generator controller and the setup interface are configured to perform the operation of receiving the initial request, wherein the setup interface is configured to perform the operation of determining the location and determining the one or more locations, wherein the media generator configurator is configured to perform the operation of generating the configuration parameters, wherein at least one of the media generation module and the media generator controller is configured to perform the operation of determining the total number, wherein the media generation module is configured to perform the operation of generating the playlist file, wherein the request handler, the media generator controller, the setup interface, the media generator configurator and the media generation module are remote to the remote media player.

56. The hardware apparatus of clause 48, wherein the one or more modules comprise a request handler, a media generator controller and a position computation module that are remote to the remote media player, wherein the enabling comprises: determining whether the media sequence file exists and determining of the position if the media sequence file does not exist, wherein at least some of the request handler, the media generator controller and the position computation module are configured to perform the operation of enabling.

57. The hardware apparatus of clause 50, wherein the one or more modules comprise a media generation module, a media generator controller, a position computation module, and a request handler, wherein at least some of the media generation module, the media generator controller and the position computation module are configured to perform the operation of facilitating generation of the media sequence files, wherein at least some of the media generation module, the media generator controller and the request handler are configured to perform the operation of facilitating provision of the media sequence files.

58. The hardware apparatus of clause 51, wherein the one or more modules comprise a request handler and a position computation module, wherein the position computation module is configured to perform the operation of converting the request, wherein the request handler is configured to perform the operation of skipping.

59. The hardware apparatus of clause 40, wherein the one or more operations comprise: in response to the request, facilitating provision of a notification that the media sequence file is generated.

Examples of Apparatus Clauses

Figure 7D:
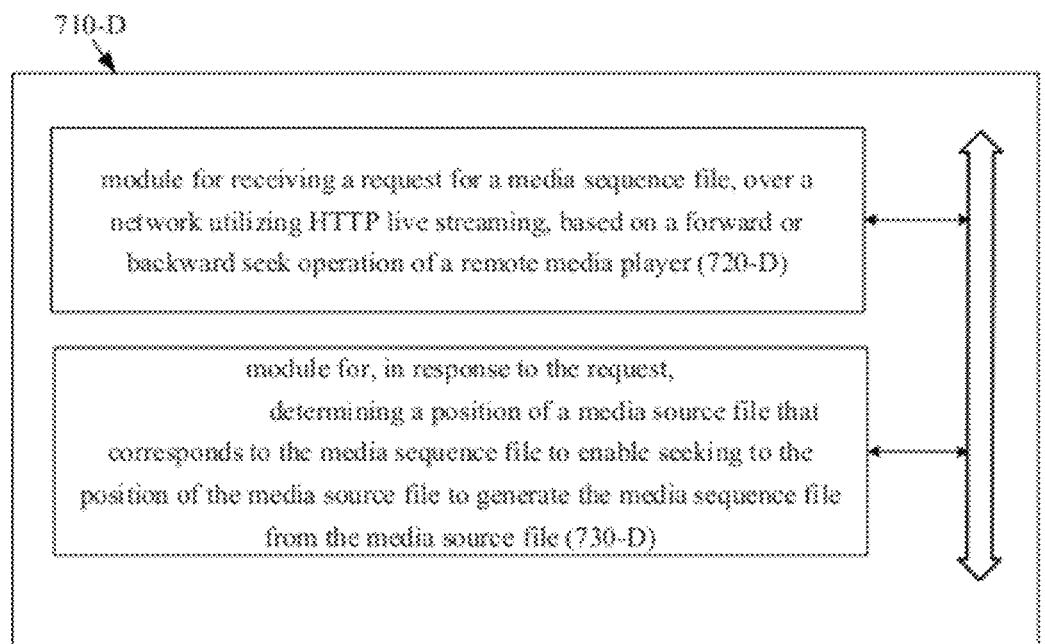
FIG. 7D is a block diagram representing an example of an apparatus in accordance with one aspect of the disclosure.

60. An apparatus (see, e.g., 710-D in FIG. 7D), comprising:

means for receiving a request for a media sequence file, over a network utilizing hypertext transfer protocol (HTTP) live streaming, based on a forward or backward seek operation of a remote media player (see, e.g., 720-D in FIG. 7D);

means for, in response to the request, determining a position of a media source file that corresponds to the media sequence file to enable seeking to the position of the media source file to generate the media sequence file from the media source file (see, e.g., 730-D in FIG. 7D), wherein the media sequence file represents one of a plurality of sequential portions of the media source file, wherein a format of the media sequence file is different from a format of the media source file, wherein the format of the media sequence file is compatible with the remote media player.

61. The apparatus of clause 60, comprising:

means for, in response to the request, making a determination as to whether the media sequence file exists to obviate re-creation of any existing media sequence files, means for, in response to the request if the determination indicates that the media sequence file exists, allowing fetching of the media sequence file and providing the fetched media sequence file without generating the media sequence file, and means for, in response to the request if the determination indicates that the media sequence file does not exist, allowing performing the determination of the position of the media source file and facilitating provision of a notification that the media sequence file is generated.

62. The apparatus of clause 60, wherein the position of the media source file is a time corresponding to the media sequence file.

63. The apparatus of clause 60, comprising:

means for, in response to a request for each media sequence file, making a determination as to whether each requested media sequence file exists, wherein the means for determining the position of the media source file, and means for facilitating provision of a notification that the media sequence file is generated, are performable only when the media sequence file is missing.

64. The apparatus of clause 60, comprising:

means for detecting a change in the remote media player's playback configuration;

means for adjusting, based on the detected change, one or more configuration parameters for generating the media sequence file.

65. The apparatus of clause 64, comprising:

means for facilitating generation of the media sequence file based on the adjusted one or more configuration parameters.

66. The apparatus of clause 60, comprising:

means for, prior to receiving the request for the media sequence file, receiving an initial request from the remote media player to play media of the media source file;

means for, in response to the initial request, performing an initial setup process, comprising:

means for determining a location of the media source file;

means for determining one or more locations for storing a playlist file and media sequence files associated with the media source file;

means for generating configuration parameters for generating the media sequence files based on the remote media player's playback configuration information.

67. The apparatus of clause 66, wherein the means for performing the initial setup process comprises:

means for determining a total number of the media sequence files to be generated for the media source file;

means for generating the playlist file comprising names of the media sequence files, wherein the media source file is not compatible with the remote media player.

wherein the playlist file and the media sequence files are compatible with the remote media player, wherein the media sequence file requested is one of the media sequence files listed on the playlist file.

68. The apparatus of clause 60, comprising:

means for facilitating creation of a playlist file for the media source file;

means for facilitating determination of a total number of media sequence files to be generated for the media source file;

means for enabling the remote media player to initiate playing at least one of the media sequence files and allowing a forward or backward seek operation, prior to creating all of the media sequence files for the media source file.

69. The apparatus of clause 60, comprising:

means for, prior to receiving the request for the media sequence file, receiving an initial request from the remote media player to play media of the media source file;

means for, in response to the initial request, determining a total number of media sequence files to be generated for the media source file;

means for, in response to the initial request, generating a playlist file comprising names of the media sequence files and the total number of the media sequence files;

means for, in response to the initial request, facilitating provision of the playlist file to the remote media player, wherein the means for determining the position of the media source file comprises means for determining the position of the media source file based on information in the playlist file.

70. The apparatus of clause 60, comprising:

means for facilitating generation of media sequence files for the media source file and means for facilitating provision of the media sequence files to the remote media player, wherein the means for facilitating generation of the media sequence files and the means for facilitating provision of the media sequence files are performable independently of the remote media player and without modifying the remote media player, wherein the means for determining the position of the media source file and means for facilitating provision of a notification that the media sequence file is generated, are performable independently of the remote media player and without modifying the remote media player.

71. The apparatus of clause 60, comprising:

means for, in response to the request, converting the request to a time and generating the media source file from the time of the media source file;

means for skipping creation of a media sequence file that already exists.

72. The apparatus of clause 60, comprising:
means for facilitating provision of media sequence files to the remote media player over the network utilizing HTTP live streaming, wherein the network comprises one or more of the Internet and a wireless network.

73. The apparatus of clause 61, comprising: a request handler, a media generator controller, a position computation module, and a media generation module,
wherein one or both of the request handler and the media generator controller comprise the means for receiving the request, wherein the position computation module, or the position computation module and the media generator controller, comprise the means for determining the position of the media source file, wherein the request handler comprises the means for making the determination.
wherein the request handler, the media generator controller and the media generation module are remote to the remote media player.

74. The apparatus of clause 65, comprising: a media generator configurator, a media generator controller, and a media generation module,
wherein one or both of the media generator configurator and the media generator controller comprise the means for detecting, wherein the media generator configurator comprises the means for adjusting, wherein at least one or more of the media generator configurator, the media generator controller and the media generation module comprise the means for facilitating generation of the media sequence file,
wherein the media generator configurator, the media the generator controller and the media generation module are remote to the remote media player.

75. The apparatus of clause 67, comprising: a request handler, a media generator controller, a setup interface, a media generator configurator, and a media generation module,
wherein one or more of the request handler, the media generator controller and the setup interface comprise the means for receiving the initial request, wherein the setup interface comprises the means for determining the location and the means for determining the one or more locations, wherein the media generator configurator comprises the means for generating the configuration parameters, wherein at least one of the media generation module and the media generator controller comprises the means for determining the total number, wherein the media generation module comprises the means for generating the playlist file,
wherein the request handler, the media generator controller, the setup interface, the media generator configurator and the media generation module are remote to the remote media player.

76. The apparatus of clause 68, comprising: a request handler, a media generator controller and a position computation module that are remote to the remote media player,
wherein the means for enabling comprises: means for determining whether the media sequence file exists and means for determining of the position if the media sequence file does not exist,
wherein at least some of the request handler, the media generator controller and the position computation module comprise the means for enabling.

77. The apparatus of clause 70, comprising: a media generation module, a media generator controller, a position computation module, and a request handler,
wherein at least some of the media generation module, the media generator controller and the position computation module comprise the means for facilitating generation of the media sequence files, wherein at least some of the media generation module, the media generator controller and the request handler comprise the means for facilitating provision of the media sequence files.

78. The apparatus of clause 71, comprising: a request handler and a position computation module, wherein the position computation module comprises the means for converting the request, wherein the request handler comprises the means for skipping.

79. The apparatus of clause 60, comprising: means for, in response to the request, facilitating provision of a notification that the media sequence file is generated.

Other Remarks

In one aspect, any of the foregoing clauses may depend from any one of the foregoing independent clauses or any one of the foregoing dependent clauses. In one aspect, any of the clauses dependent or independent clauses) may be combined with any other clauses (e.g., dependent or independent clauses). In one aspect, a claim may include only some or all of the elements (e.g., steps, operations, means or components) recited in a clause. In one aspect, a claim may include some or all of the elements recited in one or more clauses. In one aspect, some of the elements in each of the clauses may be removed. In one aspect, additional elements may be added to a clause. In one aspect, any methods, instructions, code, means, logic, components, modules (e.g., software or hardware) described, above can be represented in drawings (e.g., flow charts, block diagrams). In one aspect, the subject technology may be implemented without utilizing some of the components, elements, functions or operations described herein. In one aspect, the subject technology may be implemented additional components, elements, functions or operations.

Those of skill in the art would appreciate that items such as the various illustrative blocks, modules, elements, components, methods, and algorithms described herein a media generator 240, HTTP server 120, a media player 130, 221, 222, 223, 224, 225, 226, 249, 241, 242, 243, 244, 710-C, 740-C, 710-D, 720-D, 730-D and the components therein) may be implemented as electronic hardware, computer software, or a combination of both.

To illustrate the interchangeability of hardware and software, items such as the various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application.

In one aspect, "means," a block, a module, an element, a component or a processor may be an item (e.g., one or more of blocks, modules, elements, components or processors) for performing one or more functions or operations. In one aspect, such an item may be an apparatus, hardware, or a portion thereof. In one example, an item may be, for example, an instruction(s) for performing the function(s) or operation(s), where the instruction(s) are encoded or stored on a machine-readable medium, on another device, or on a portion thereof, where an instruction(s) may be software, an application(s), a subroutine(s), or a portion thereof. In an example, an item may be implemented as one or more circuits configured to perform the function(s) or operation(s). A circuit may include one or more circuits and/or logic. A circuit may be analog and/or digital. A circuit may be electrical and/or optical. A circuit may include transistors. In an example, one or more items may be implemented as a processing system (e.g., DSP, ASIC, FPGA, etc.). Those skilled in the art will recognize how to implement the instructions, circuits, and processing systems.

In one aspect of the disclosure, when actions or functions are described as being performed by an item (e.g., receiving, determining, providing, generating, converting, skipping, displaying, notifying, accepting, selecting, controlling, issuing, transmitting, reporting, or any other action or function), it is understood that such actions or functions may be performed by the item directly or indirectly. As an example, when a module is described as performing an action, it is understood that the module may perform the action directly or may perform the action indirectly, for example, by facilitating such an action.

Various items may be arranged differently (e.g., arranged in a different order, or partitioned in a different way) all without departing from the scope of the subject technology, in one example, the controller 222, or some of the components of the controller 222, may be arranged as a part of an HTTP server rather than part of a media generator. In one aspect of the disclosure, the elements recited in the accompanying claims may be performed by one or more modules or sub-modules.

It is understood that the specific order or hierarchy of steps, operations or processes disclosed is an illustration of exemplary approaches. Based upon design preferences, it is understood that the specific order or hierarchy of steps, operations or processes may be rearranged. Some of the steps, operations or processes may be performed simultaneously. The accompanying method claims, if any, present elements of the various steps, operations or processes in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied, to other aspects. A reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs. In one aspect, various alternative configurations and operations described herein may be considered to be at least equivalent.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

The Abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The scope of protection is limited solely by the claims that now follow. The claims are not intended to be limited to the aspects described herein, but is to be accorded the full scope consistent with the language claims and to encompass all legal equivalents. Notwithstanding, none of the claims are intended to embrace subject matter that fails to satisfy the requirement of 35 U.S.C. §101, 102, or 103, nor should they be interpreted in such a way. Any unintended embracement of such subject matter is hereby disclaimed.

What is claimed is:

1. A method for dynamically generating media sequence files on demand for hypertext transfer protocol (HTTP) live streaming, comprising:
   based on a seek operation of a remote media player, receiving a first request for a media sequence file over a network utilizing HTTP live streaming; and
   in response to the first request,
      identifying a position of a media source file, the position corresponding to the seek operation;

making a determination whether the media sequence file exists;
when the determination indicates that the media sequence file exists, allowing fetching of the media sequence file;
when the determination indicates that the media sequence file does not exist, generating the media sequence file from the first media portion of the media source file; and
facilitating provision of a notification that the media sequence file is generated,
wherein the media sequence file includes a first media portion of a plurality of sequential media portions included in the media source file, the first media portion corresponding to the position,
wherein a first format of the media sequence file is different from a second format of the media source file, and
wherein the first format is compatible with the remote media player.

2. The method of claim 1, wherein the position of the media source file is a time corresponding to the seek operation.

3. The method of claim 1, further comprising:
based on a change in a playback configuration for the remote media player, adjusting a configuration parameter used for the generating the media sequence file.

4. The method of claim 3, wherein the generating the media sequence file includes:
generating the media sequence file using the adjusted configuration parameter.

5. The method of claim 1, further comprising:
prior to receiving the first request, receiving a second request from the remote media player to play media of the media source file; and
in response to the second request, performing an initial setup process, comprising:
determining a first location of the media source file;
determining a second location for storing a playlist file;
determining a third location for storing media sequence files associated with the media source file; and
generating configuration parameters used for the generating the media sequence files.

6. The method of claim 5, wherein the initial setup process further comprises:
determining a total number of the media sequence files in the first format associated with the media source file in the second format; and
generating the playlist file, the playlist file specifying names of the media sequence files,
wherein the second format is not compatible with the remote media player,
wherein a third format of the playlist file is compatible with the remote media player, and
wherein the first request specifies a name of a media sequence file specified in the playlist file.

7. The method of claim 6, further comprising:
facilitating provision of the playlist file to the remote media player,
wherein the identifying the position of the media source file is based on information in the playlist file.

8. The method of claim 1, further comprising:
facilitating creation of a playlist file for the media source file;
based on the playlist file, facilitating determination of a total number of media sequence files to be generated from the media source file; and prior to completion of generating the media sequence files, enabling the remote media player to:
initiate playing at least one of the media sequence files; and
perform a seek operation.

9. The method of claim 1, further comprising:
facilitating provision of the media sequence file to the remote media player,
wherein the identifying the position of the media source file, the generating of the media sequence file, and the facilitating provision of the media sequence file are performed external to the remote media player.

10. The method of claim 9, wherein the media sequence file is sent to the remote media player using HTTP live streaming, and wherein the network comprises at least one of: the Internet and a wireless network.

11. The method of claim 1, further comprising:
in response to the first request, converting the position of the media source file to a time.

12. A non-transitory computer-readable medium comprising instructions executable by a processor, the instructions, when executed by the processor, for:
based on a seek operation of a remote media player, receiving a first request for a media sequence file over a network utilizing hypertext transfer protocol (HTTP) live streaming; and
in response to the first request,
identifying a position of a media source file, the position corresponding to the seek operation;
making a determination whether the media sequence file exists;
when the determination indicates that the media sequence file exists, allowing fetching of the media sequence file; and
when the determination indicates that the media sequence file does not exist, generating the media sequence file from the first media portion of the media source file,
wherein the media sequence file includes a first media portion of a plurality of sequential media portions included in the media source file, the first media portion corresponding to the position,
wherein a first format of the media sequence file is different from a second format of the media source file, and
wherein the first format is compatible with the remote media player.

13. The computer-readable medium of claim 12, wherein the position of the media source file is a time corresponding to the seek operation.

14. The computer-readable medium of claim 12, further comprising instructions for:
based on a change in a playback configuration for the remote media player, adjusting a configuration parameter used for the generating the media sequence file.

15. The computer-readable medium of claim 14, wherein the instructions for generating the media sequence file include instructions for:
generating the media sequence file using the adjusted configuration parameter.

16. The computer-readable medium of claim 12, further comprising instructions for:
prior to receiving the first request, receiving a second request from the remote media player to play media of the media source file; and
in response to the second request, performing an initial setup process, comprising:
determining a first location of the media source file;
determining a second location for storing a playlist file;

determining a third location for storing media sequence files associated with the media source file; and generating configuration parameters used for the generating the media sequence files.

17. The computer-readable medium of claim 16, wherein the initial setup process further comprises:

determining a total number of the media sequence files in the first format associated with the media source file in the second format; and generating the playlist file, the playlist file specifying names of the media sequence files, wherein the second format is not compatible with the remote media player, wherein a third format of the playlist file is compatible with the remote media player, and wherein the first request specifies a name of a media sequence file specified in the playlist file.

18. The computer-readable medium of claim 17, further comprising instructions for:

facilitating provision of the playlist file to the remote media player, wherein the identifying the position of the media source file is based on information in the playlist file.

19. The computer-readable medium of claim 12, further comprising instructions for:

facilitating creation of a playlist file for the media source file;

based on the playlist file, facilitating determination of a total number of media sequence files to be generated from the media source file; and prior to completion of generating the media sequence files, enabling the remote media player to:

initiate playing at least one of the media sequence files; and perform a seek operation.

20. The computer-readable medium of claim 12, further comprising instructions for:

facilitating provision of the media sequence file to the remote media player, wherein the identifying the position of the media source file, the generating of the media sequence file, and the facilitating provision of the media sequence file are performed external to the remote media player.

21. The computer-readable medium of claim 12, further comprising instructions for:

in response to the first request, converting the position of the media source file to a time.

22. The computer-readable medium of claim 12, further comprising instructions for:

in response to the first request, facilitating provision of a notification that the media sequence file is generated.

23. A hardware apparatus, comprising:

a processor configured to access memory media, wherein the memory media store instructions executable by the processor, the instructions, when executed by the processor, for:

based on a seek operation of a remote media player, receiving a first request for a media sequence file over a network utilizing hypertext transfer protocol (HTTP) live streaming; and in response to the first request, identifying a position of a media source file, the position corresponding to the seek operation;

making a determination whether the media sequence file exists;

when the determination indicates that the media sequence file exists, allowing fetching of the media sequence file; and when the determination indicates that the media sequence file does not exist, generating the media sequence file from the first media portion of the media source file, wherein the media sequence file includes a first media portion of a plurality of sequential media portions included in the media source file, the first media portion corresponding to the position, wherein a first format of the media sequence file is different from a second format of the media source file, and wherein the first format is compatible with the remote media player.

24. The hardware apparatus of claim 23, wherein the position of the media source file is a time corresponding to the seek operation.

25. The hardware apparatus of claim 23, wherein the memory media store instructions for:

based on a change in a playback configuration for the remote media player, adjusting a configuration parameter used for the generating the media sequence file; and generating the media sequence file using the adjusted configuration parameter.

26. The hardware apparatus of claim 23, wherein the memory media store instructions for:

prior to receiving the first request, receiving a second request from the remote media player to play media of the media source file; and in response to the second request, performing an initial setup process, comprising:

determining a first location of the media source file;

determining a second location for storing a playlist file;

determining a third location for storing media sequence files associated with the media source file;

generating configuration parameters used for the generating the media sequence files;

determining a total number of the media sequence files in the first format associated with the media source file; in the second format; and generating the playlist file, the playlist file specifying names of the media sequence files, wherein the second format is not compatible with the remote media player, wherein a third format of the playlist file is compatible with the remote media player, and wherein the first request specifies a name of a media sequence file specified in the playlist file.

27. The hardware apparatus of claim 26, wherein the memory media store instructions for:

facilitating provision of the playlist file to the remote media player, wherein the identifying the position of the media source file is based on information in the playlist file.

28. The hardware apparatus of claim 23, wherein memory media store instructions for:

facilitating creation of a playlist file for the media source file;

based on the playlist file, facilitating determination of a total number of media sequence files to be generated from the media source file; and prior to completion of generating the media sequence files, enabling the remote media player to:

initiate playing at least one of the media sequence files; and perform a seek operation.

29. The hardware apparatus of claim 23, wherein the memory media store instructions for:
  facilitating provision of the media sequence file to the remote media player,
  wherein the identifying the position of the media source file, the generating of the media sequence file, and the facilitating provision of the media sequence file are performed external to the remote media player.

30. The hardware apparatus of claim 23, wherein the memory media store instructions for:
  in response to the first request, converting the position of the media source file to a time.

31. The hardware apparatus of claim 23, wherein the memory media store instructions for:
  in response to the first request, facilitating provision of a notification that the media sequence file is generated.

\* \* \* \* \*